(12) United States Patent
Kitajima et al.

(10) Patent No.: US 7,198,218 B2
(45) Date of Patent: Apr. 3, 2007

(54) BRAKE OPERATION STRUCTURE FOR FISHING REEL SPOOL

(75) Inventors: Keigo Kitajima, Sakai (JP); Takuji Takamatsu, Sakai (JP); Ng Keng Huat, Singapore (SG)

(73) Assignee: Shimano Inc., Osaka (JP)

( * ) Notice: Subject to any disclaimer, the term of this patent is extended or adjusted under 35 U.S.C. 154(b) by 92 days.

(21) Appl. No.: 11/131,363

(22) Filed: May 18, 2005

(65) Prior Publication Data

US 2005/0279872 A1    Dec. 22, 2005

(30) Foreign Application Priority Data

May 20, 2004  (JP) .............................. 2004-150084
Jun. 9, 2004   (JP) .............................. 2004-171290
Jun. 9, 2004   (JP) .............................. 2004-171293

(51) Int. Cl.
*A01K 89/01*  (2006.01)

(52) U.S. Cl. ...................................... 242/245; 242/303

(58) Field of Classification Search ................ 242/245, 242/244, 243, 285, 302, 303
See application file for complete search history.

(56) References Cited

U.S. PATENT DOCUMENTS 4,598,879 A * 7/1986 Fujigiwa et al. ............ 242/245
4,747,558 A * 5/1988 Saito ........................... 242/245
4,804,150 A * 2/1989 Takeuchi ...................... 242/245
4,988,057 A * 1/1991 Hitomi ......................... 242/245
5,259,565 A * 11/1993 Hitomi ......................... 242/245
5,374,002 A * 12/1994 Sato ............................ 242/290
6,029,922 A * 2/2000 Kim et al. ................... 242/283
6,409,112 B1 * 6/2002 Hyon ........................... 242/285
6,422,497 B1 * 7/2002 Kyon ........................... 242/267

FOREIGN PATENT DOCUMENTS

JP         60-168375 U       11/1985

\* cited by examiner

*Primary Examiner*—Emmanuel M Marcelo
(74) *Attorney, Agent, or Firm*—Global IP Counselors, LLP

(57) ABSTRACT

A brake operation structure is mounted on a reel unit, and adjusts a braking force applied to a spool. This brake operation structure includes a mounting tube, an operation knob, and a screw member. The mounting tube is formed to project from the reel unit. The operation knob is formed in a closed-end tubular shape to accommodate the mounting tube. The screw member has two male threaded portions that have a tubular shape when coupled to one another. The operation knob is pivotably retained to the mounting tube when the screw member engages an outer peripheral portion of the mounting tube and an inner peripheral portion of the operation knob. The operation knob is prevented from falling off from the mounting tube, while allowing the operation knob to pivot stably relative to the mounting unit.

20 Claims, 15 Drawing Sheets

BRAKE OPERATION STRUCTURE FOR FISHING REEL SPOOL

BACKGROUND OF THE INVENTION

1. Field of the Invention

The present invention relates to a brake operation structure. More particularly, the present invention relates to a brake operation structure of a spool of a fishing reel that is arranged on a reel unit of the fishing reel, and serves to adjust the braking force of the spool.

2. Background Information

A brake operation structure that allows the braking force to be changed through rotational operation and adjustment in various structures built into the interior of a reel unit of a spool is widely used in conventional fishing reels. One example of this type of brake operation structure is one which adjusts the drag force of a rear drag mechanism of a rear drag type spinning reel.

A brake operation structure that is employed in a rear drag mechanism of a conventional spinning reel includes a mounting unit, an operation knob, a sound producing member, and a fixing bolt. The mounting unit is formed to project in a cylindrical shape on the rear portion of the reel unit, and has a male threaded portion on its outer peripheral portion. The operation knob is formed in a closed-end cylindrical shape so as to accommodate the mounting unit, and has a female threaded portion on the inner periphery thereof. The female threaded portion can be screwed onto the male threaded portion of the mounting unit. In addition, a pressing member is included in the operation knob, and the pressing member is arranged on the rear portion of the rear drag structure in the inner peripheral portion of the mounting unit. The pressing member is composed of a cylindrical pressing portion and a projection that projects outward in a cylindrical shape from the pressing portion. The pressing portion is arranged on the rear drag mechanism side, and is a portion which presses the rear drag mechanism. The projection is formed to have a smaller diameter than that of the pressing portion, is arranged on the operation knob side, and is mounted on the operation knob. Corrugated portions are formed at a predetermined spacing on the outer periphery of the projection.

The sound producing member is, for example, a semicircular spring member, two end portions thereof pass through from the outer peripheral side of the mounting unit to the inner peripheral side. The two end portions of the sound producing member engage, in the inner peripheral portion of the mounting unit, with the corrugated portions formed on the outer periphery of the projection of the pressing member. In addition, the two end portions of the sound producing member can engage with the rear portion of the pressing portion of the pressing member, and prevent the pressing member from falling off to the rear. The fixing bolt passes through the bottom of the operation knob from the exterior of the bottom side of the operation knob to fixedly mount the pressing member to the operation knob.

In conventional brake operation structures, the pressing member is first mounted to the rear portion of the rear drag mechanism attached to the reel unit. Next, the sound producing member is mounted on the mounting unit, and the two ends of the sound producing member engage with the corrugated portions of the projection of the pressing member to the rear of the pressing portion of the pressing member. Finally, the operation knob is screwed and mounted onto the mounting unit, and the fixing bolt is employed to fixedly mount the operation knob to the pressing member. With a brake operation structure assembled in this way, when the operation knob is rotated, the two end portions of the sound producing member will repeatedly strike the corrugated portions of the pressing member to generate clicking sounds. At this time, the pressing member fixed with the fixing bolt to the operation knob will press and release the rear drag mechanism to adjust the drag force of the rear drag mechanism. Here, when the operation knob continues to be rotated in the direction in which the pressing of the rear drag mechanism is released, the pressing member will move rearward together with the operation knob, and the rear portion of the pressing portion of the pressing member will come into contact with and engage the two end portions of the sound producing member. Thus, the operation knob which includes the pressing member will not fall out from the mounting unit.

With conventional brake operation structures, when the operation knob is rotated in the direction of releasing the pressing of the rear drag mechanism, the rear portion of the pressing portion of the pressing member comes into contact with and engages the two end portions of the sound producing member in order to prevent the operation knob, which includes the pressing member, from falling out from the mounting unit. However, when one attempts to further rotate the operation knob in the direction of releasing the pressing of the rear drag mechanism while the rear portion of the pressing portion of the pressing member is in contact with the two end portions of the sound producing member, the degree of abrasion between the female threaded portion of the operation knob and the male threaded portion of the mounting unit may increase. In addition, the threads of the female threaded portion of the operation knob and the male threaded portion of the mounting unit may be damaged in some situations. When the threads of the female threaded portion of the operation knob and/or the male threaded portion of the mounting unit become damaged, it will become difficult to stably rotate the operation knob.

In conventional brake operation structures, the operation knob is screwed onto the mounting unit. Then, the fixing bolt passes through the bottom of the operation knob from the exterior of the bottom side of the operation knob to fixedly mount the pressing member to the operation knob. When the fixing bolt is employed to mount the pressing member to the operation knob, the outward appearance of the operation knob is likely to be compromised because the bolt head is visible on the outer surface of the bottom of the operation knob.

In view of the above, it will be apparent to those skilled in the art from this disclosure that there exists a need for an improved brake operation structure for fishing reel spool that overcomes the problems of the prior art. This invention addresses this need in the art as well as other needs, which will become apparent to those skilled in the art from this disclosure.

SUMMARY OF THE INVENTION

An object of the present invention is to prevent the operation knob from falling off from the mounting unit of the brake operation structure, while allowing the operation knob to rotate stably with respect to the mounting unit.

Another object of the present invention is to allow an operation knob to be mounted on the mounting unit of the brake operation structure without compromising the outward appearance of the operation knob.

A brake operation structure for a fishing reel according to the first aspect of the present invention is mounted on a reel unit of the fishing reel. The brake operation structure is adapted to adjust a braking force applied to a spool. The brake operation structure includes a mounting unit having a tubular shape and formed to project from the reel unit; an operation knob that is formed in a closed-end tubular shape to accommodate the mounting unit; and an engagement member having a plurality of divided portions. The plurality of divided portions has a tubular shape when coupled to one another. The operation knob is pivotably retained to the mounting unit when the engagement member engages an outer peripheral portion of the mounting unit and an inner peripheral portion of the operation knob.

In this brake operation structure, the engagement member having divided portions is mounted on the mounting unit from the outer radial direction of the mounting unit. In other words, the engagement member engages with the outer periphery of the mounting unit. The operation knob accommodates the mounting unit in the inner peripheral portion, and engages with the engagement member on the inner peripheral portion. This type of operation knob can be pivoted with respect to the mounting unit and be retained in the projecting direction of the mounting unit. In the mean time, the braking force of the spool can be adjusted by rotating the operation knob.

Here, the engagement member will engage with the mounting unit and the operation knob between the outer periphery of the mounting unit and the inner periphery of the operation knob, and the operation knob can be pivoted with respect to the mounting unit and be retained in the projecting direction of the mounting unit. In other words, the braking force of the spool can be adjusted by pivoting the operation knob. In this way, the operation knob can be prevented from falling off from the mounting unit, while the operation knob can be stably rotated with respect to the mounting unit. Thus, the operation knob can be mounted on the mounting unit without having to compromise the outward appearance of the operation knob because there is no need to employ a fixing member such as a fixing bolt in order to retain and operate the operation knob.

The brake operation structure of a spool of a fishing reel according to the second aspect of the present invention is the brake operation structure of the first aspect of the present invention, in which the mounting unit has an annular groove formed on its outer peripheral portion, and the engagement member has a first retaining projection formed on its inner peripheral portion, the first retaining projection engaging the annular groove of the mounting unit. In this way, by engaging the first retaining projection of the engagement member in the annular groove of the mounting unit, the engagement member can be prevented from falling off from the mounting unit, and the engagement member can be stably pivoted with respect to the mounting unit.

The brake operation structure of a spool of a fishing reel according to the third aspect of the present invention is the brake operation structure of the first or the second aspect of the present invention, in which the engagement member has a first male threaded portion formed on its outer peripheral portion, and the operation knob has a first female threaded portion formed on its inner peripheral portion, the first male threaded portion engaging the first female threaded portion. In this situation, a first female threaded portion formed on the inner periphery of the operation knob can be screwed onto the first male threaded portion formed on the outer periphery of the engagement member. Thus, by screwing the first female threaded portion of the operation knob onto the first male threaded portion of the engagement member, the operation knob can link with the engagement member and be stably pivoted together with the engagement member around the mounting unit.

The brake operation structure of a spool of a fishing reel according to the fourth aspect of the present invention is the brake operation structure of the third aspect of the present invention, in which the engagement member includes a cylindrical portion and a brim portion that is formed on an outer periphery of one end of the cylindrical portion, the brim portion projecting radially outward, an outer diameter of the brim portion being greater than an outer diameter of the first male threaded portion formed on the outer peripheral portion of the cylindrical portion.

In this situation, the outer diameter of the brim portion formed on the outer periphery of one end of the engagement member is formed to be larger than the outer diameter of the first male threaded portion formed on the outer periphery of the engagement member. Thus, when the first female threaded portion formed on the inner periphery of the operation knob is screwed onto the first male threaded portion formed on the outer periphery of the engagement member, the operation knob will come into contact with the brim portion of the engagement member and be securely tightened and mounted on the engagement member.

The brake operation structure of a spool of a fishing reel according to the fifth aspect of the present invention is the brake operation structure of any of the first through fourth aspects of the present invention, in which the mounting unit has a second female threaded portion formed in its inner peripheral portion, the operation knob has a moving member that is non-rotatably mounted on a bottom surface inside the closed-end tubular shape, the moving member being movable in a direction of a spool shaft relative to the operation knob, and the moving member has a second male threaded portion on its outer peripheral portion, the second male portion engaging the second female threaded portion of the mounting unit, the moving member pivoting and moving in the spool shaft direction relative to the mounting unit when the operation knob is pivoted.

In this situation, the operation knob includes a moving member non-rotatably mounted on the bottom surface. The moving member is arranged on the inner periphery of the mounting unit by screwing the second male threaded portion into the second female threaded portion of the inner periphery of the mounting unit. In this state, when the operation knob is rotated, the moving member will rotate on the inner peripheral portion of the mounting unit while moving in the spool shaft direction, and the braking force of the spool will be adjusted. If this is performed, when the operation knob retained on the mounting unit via the engagement member is rotated with respect to the mounting unit, the braking force of the spool can be reliably adjusted.

The brake operation structure of a spool of a fishing reel according to the sixth aspect of the present invention is the brake operation structure of any of the first through fifth aspects of the present invention, in which the mounting unit has on its outer peripheral portion a second retaining projection on its rear end, and a third male threaded portion on its base end, the second retaining projection being formed to project radially outward. The engagement member has a third female threaded portion formed on its inner peripheral portion, the third female threaded portion engaging the third male threaded portion of the mounting unit, an outer diameter of the second retaining projection being greater than an inner diameter of the third female threaded portion.

In this situation, a third female threaded portion formed on the inner periphery of the engagement member can be screwed onto the third male threaded portion formed on the outer periphery of the base end of the mounting unit. The inner diameter of the third female threaded portion of the engagement member is formed to be smaller than the outer diameter of the second retaining projection formed on the outer periphery of the tip side of the mounting unit. Thus, by screwing the third female threaded portion of the engagement member onto the third male threaded portion of the mounting unit, the engagement member can be stably rotated with respect to the mounting unit. At this point, when the engagement member is rotated and moved to the tip side of the mounting unit, the engagement member can be prevented from falling off from the mounting unit because the engagement member will come into contact with the second retaining projection of the tip side of the mounting unit. Here, when the engagement member comes into contact with the second retaining projection of the mounting unit, abrasion and damage to screw threads that may occur during retaining between the third male threaded portion of the mounting unit and the third female threaded portion of the engagement member can be prevented, because the engagement member can no longer be rotated or moved to the tip side of the mounting unit.

The brake operation structure of a spool of a fishing reel according to the seventh aspect of the present invention is the brake operation structure of the sixth aspect of the present invention, in which the operation knob has one of a recess and a projection formed in its inner peripheral portion, the one of the recess and the projection extending in a direction of a spool shaft, and the engagement member has the other of the recess and the projection formed in its outer peripheral portion, the other of the recess and the projection engaging the one of the recess and the projection to restrict relative rotation between the operation knob and the engagement member.

In this situation, the projection formed on, for example, the outer periphery of the engagement member can be engaged in the recess formed in, for example, the inner periphery of the operation knob. Thus, by engaging the projection of the engagement member in the recess of the operation knob, the operation knob can be linked with the engagement member and be stably pivoted with respect to the engagement member and the mounting unit.

The brake operation structure of a spool of a fishing reel according to the eighth aspect of the present invention is the brake operation structure of the seventh aspect of the present invention, in which a detent portion is formed projecting from a bottom of the recess so as to prevent the projection from disengaging from the recess.

In this situation, because the detent portion is formed on the bottom of the recess of, for example, the operation knob, when the projection of the engagement member is engaged in the recess of the operation knob, the projection of the engagement member can be prevented from falling out from the recess of the operation knob due to the detent portion. Thus, the operation knob can be linked to the engagement member and stably pivoted with respect to the engagement member and the mounting unit.

The brake operation structure of a spool of a fishing reel according to the ninth aspect of the present invention is the brake operation structure of the seventh aspect of the present invention, in which the operation knob has the recess formed in its inner peripheral portion, and the engagement member has the projection formed in its outer peripheral portion.

The brake operation structure of a spool of a fishing reel according to the tenth aspect of the present invention is the brake operation structure of the first aspect of the present invention, in which the mounting unit is formed to project rearward from the reel unit of a spinning reel, so as to accommodate a rear drag mechanism that applies a braking force to the spool, and the brake operation structure is adapted to adjust the braking force of the rear drag mechanism applied to the spool by pivoting the operation knob.

In this way, the operation knob for adjusting the rear drag mechanism can be prevented from falling off from the mounting unit, and the operation knob can be stably pivoted with respect to the mounting unit. Thus, the operation knob can be mounted on the mounting unit without compromising the outward appearance of the operation knob because there is no need to employ a fixing member such as a fixing bolt in order to retain and operate the operation knob.

The brake operation structure of a spool of a fishing reel according to the eleventh aspect of the present invention is the brake operation structure of the tenth aspect of the present invention, in which the operation knob has an adjustment portion that is arranged to project from a bottom surface inside the closed-end tubular shape, and the adjustment portion is designed to move in a spool shaft direction within the inner peripheral portion of the mounting unit and adjust the braking force to the spool when the operation knob is pivoted.

In this situation, by pivoting the operation knob, the adjustment portion arranged on the bottom of the operation knob will move in the spool shaft direction in the inner peripheral portion of the mounting unit, and the braking force of the spool will be adjusted. If this is performed, when the operation knob retained on the mounting unit via the engagement member is pivoted with respect to the mounting unit, the braking force of the spool can be reliably adjusted. In this situation, when the operation knob is pivoted, the adjustment portion arranged on the bottom of the operation knob will move in the spool shaft direction in the inner peripheral portion of the mounting unit, and the braking force of the spool will be adjusted. If this is performed, when the operation knob retained on the mounting unit via the engagement member is pivoted with respect to the mounting unit, the braking force of the spool can be reliably adjusted.

The brake operation structure of a spool of a fishing reel according to the twelfth aspect of the present invention is the brake operation structure of the first aspect of the present invention, in which the mounting unit is formed to project laterally from the reel unit of a double bearing reel, and the brake operation structure is a casting control mechanism adapted to adjust a braking force applied to the spool by pivoting the operation knob.

Here, the operation knob is an operation knob of a casting control mechanism that brakes a shaft member that rotates in association with the spool shaft. In this way, the operation knob of a casting control mechanism can be prevented from falling off from the mounting unit, and the operation knob can be stably pivoted with respect to the mounting unit.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
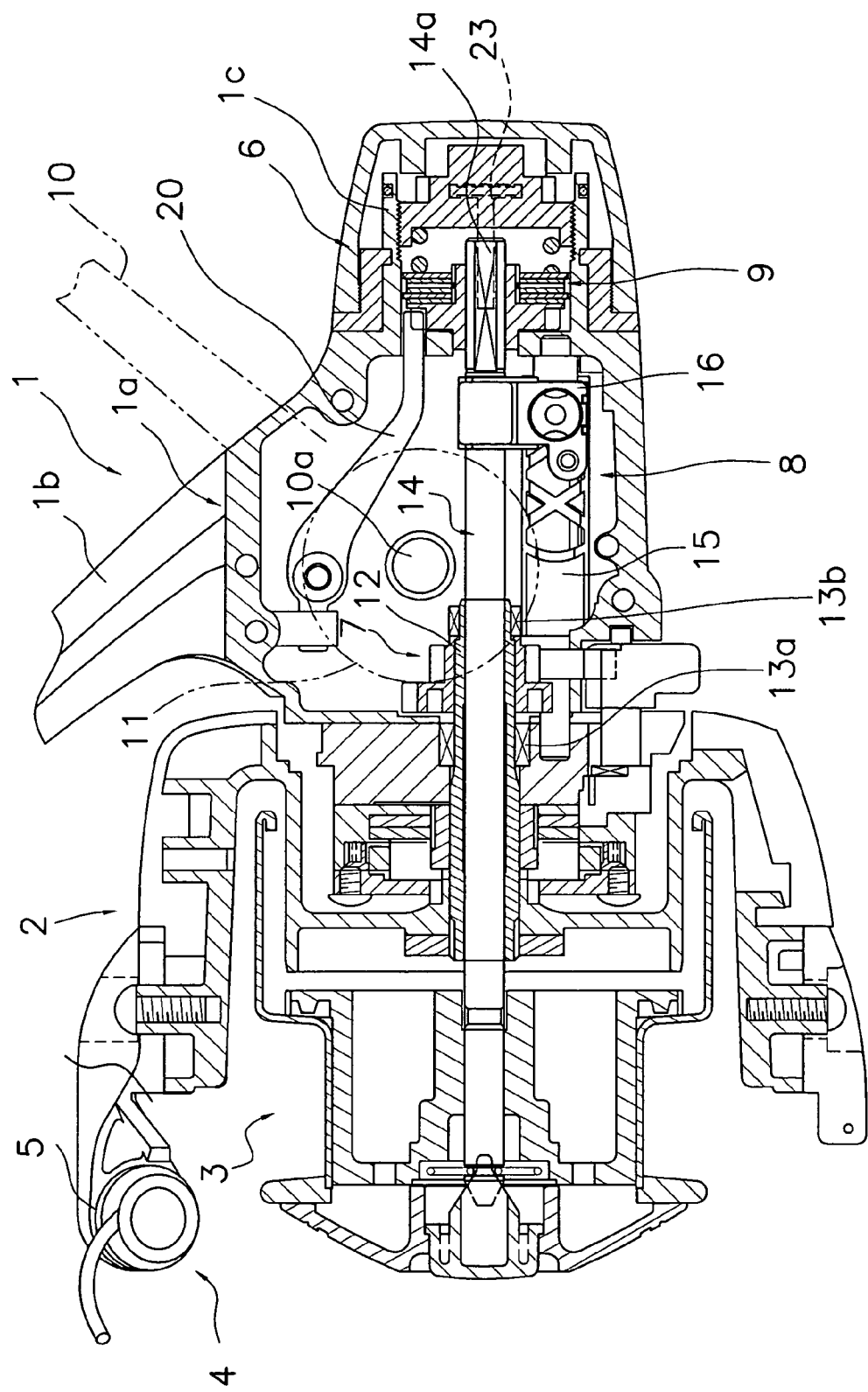
FIG. 1 is a cross sectional view of a spinning reel in accordance with a first embodiment of the present invention.

FIG. 1 shows a rear drag reel in which one embodiment of the present invention is adapted, the spinning reel including a reel unit 2, a handle 10 rotatively supported on the reel unit 2, a rotor 2 rotatively supported on the front of the reel unit 2, and a spool 3 disposed on the front of the rotor 2 and around which fishing line is wound. A bail arm 4 for winding fishing line around the spool 3 is pivotably mounted on the rotor 2. A line roller 5 that guides the fishing line is mounted on the bail arm 4.

As shown in FIG. 1, the reel unit 1 includes a reel body 1a, and a rod attachment portion 1b for attaching the spinning reel to a fishing rod is formed on the upper portion of the reel body 1a. A mounting tube 1c that projects rearward is unitarily arranged on the rear portion of the reel body 1a.

Figure 2:
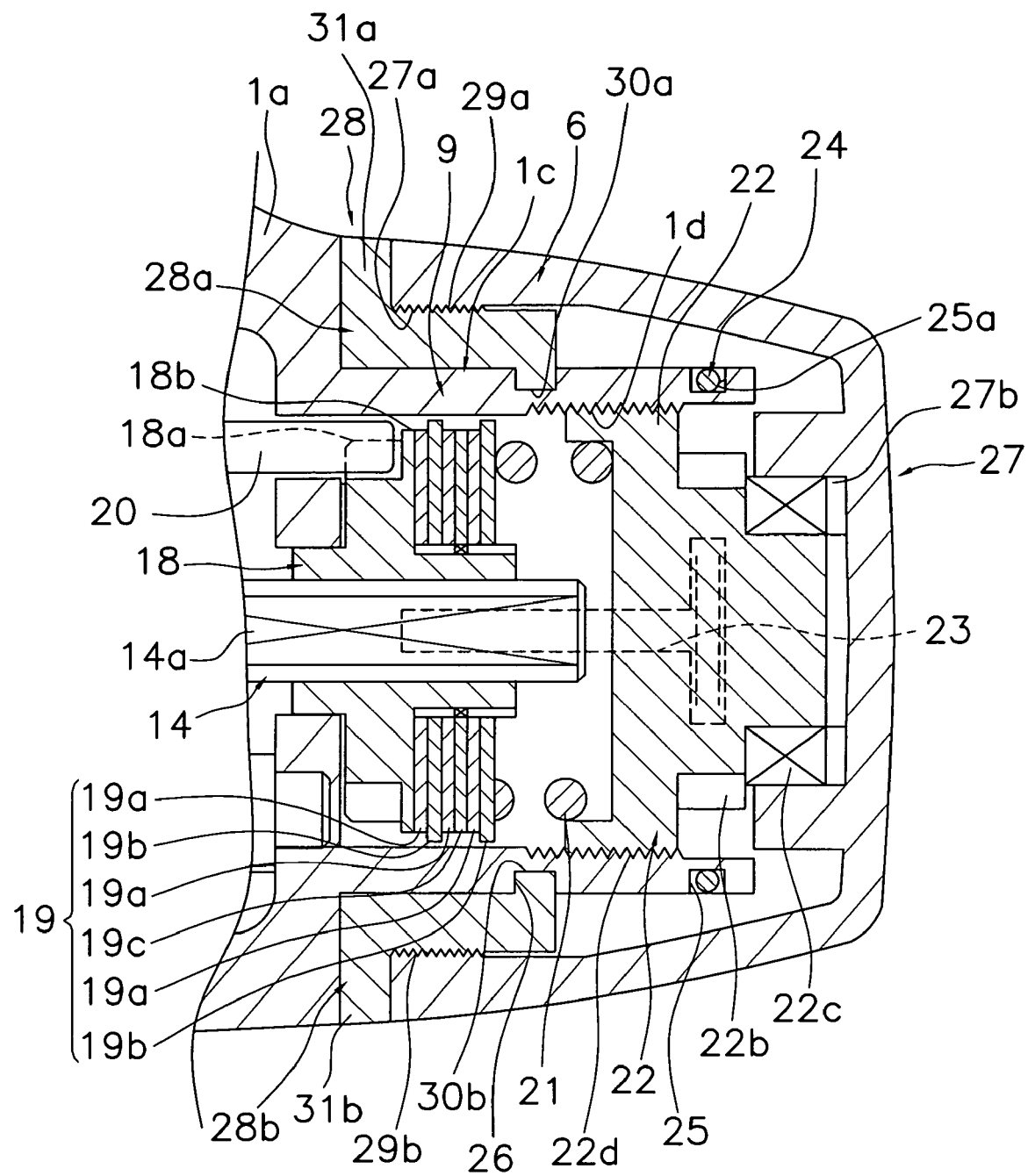
FIG. 2 is an enlarged cross-sectional view of the brake operation structure of the spinning reel in accordance with the first embodiment of the present invention.
Figure 3:
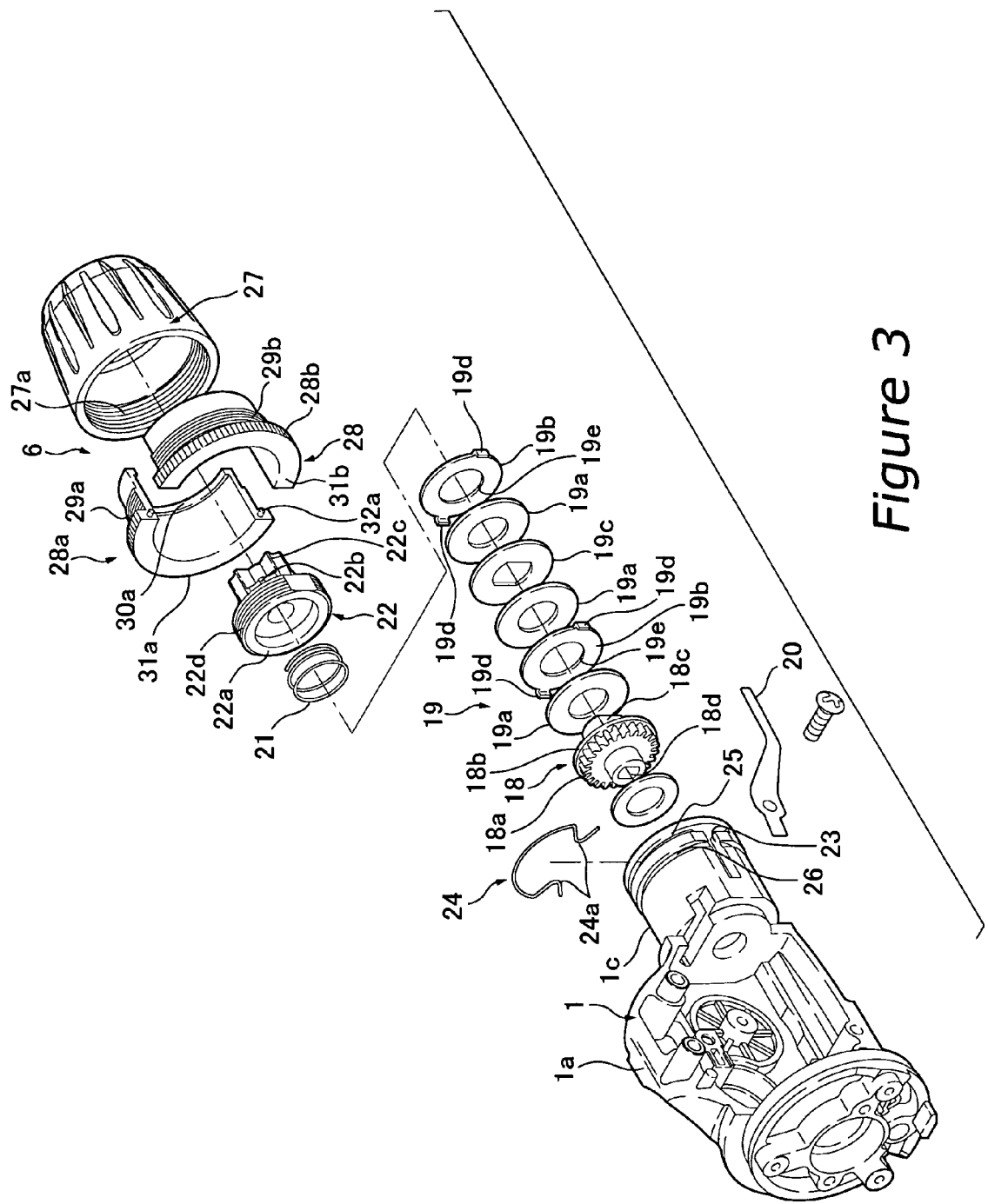
FIG. 3 is an exploded oblique view of the brake operation structure in accordance with the first embodiment of the present invention.
Figure 4:
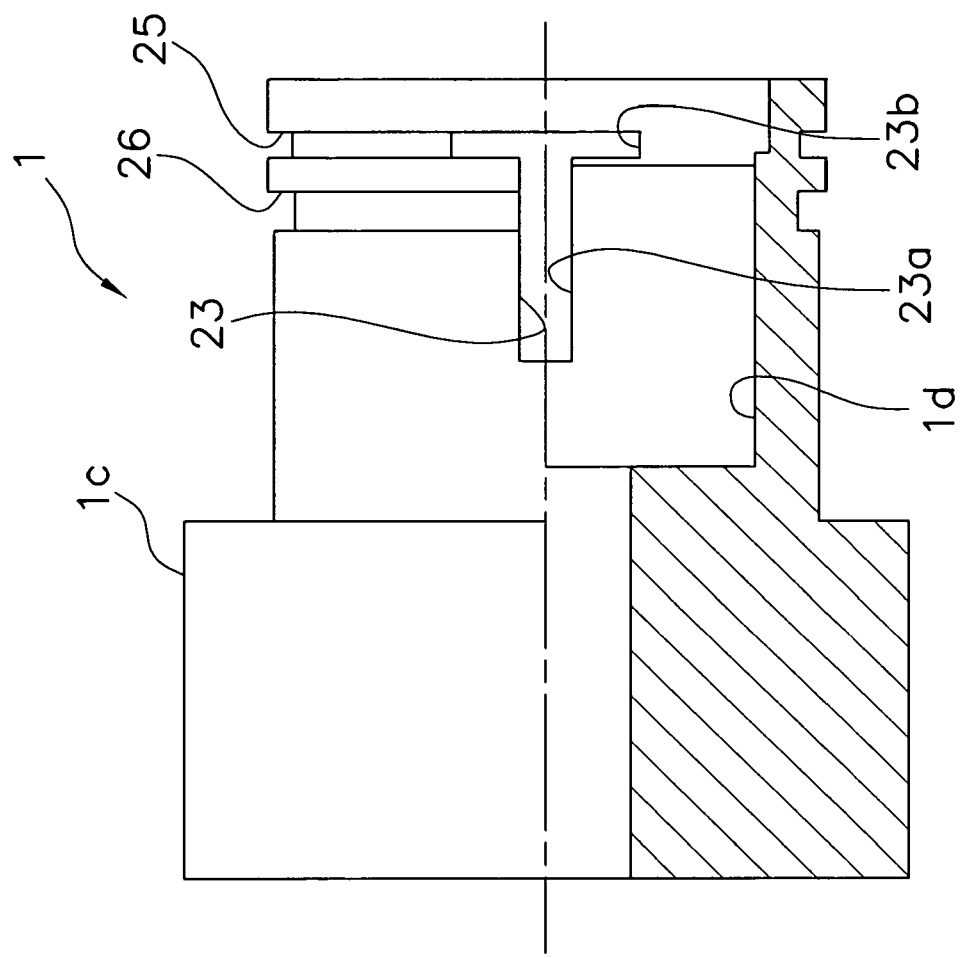
FIG. 4 is a partially lateral and partially cross-sectional view of a mounting tube of the brake operation structure in accordance with the first embodiment of the present invention.

As shown in FIGS. 2 to 4, the mounting tube 1c is a tubular member that is unitarily or separately formed with the reel body 1a, and has retaining grooves 26 and an annular mounting groove 25 that are arranged to be adjacent to each other from front to rear on the outer peripheral surface of the mounting tube 1c. In addition, as shown in FIGS. 1 to 5, the mounting tube 1c has the female threaded portion 1d formed on the inner peripheral portion. The mounting tube 1c also has the pass through long hole 23s that pass through from the outer peripheral portion to the inner peripheral portion and which extend in the front to rear direction.

The mounting tube 1c is obtained by die casting a synthetic resin such as polyamide or a metal, and both the female threaded portion 1d and the pass through long hole 23 are simultaneously formed by a single casting. The female threaded portion 1d is cast while a loose core having a contour of a male threaded portion 22d on the outer periphery thereof is placed on a portion of the mounting tube 1c on which the female threaded portion 1d is supposed to be formed, and then removing the loose core after casting by rotating the loose core. The pass through long holes 23 are simultaneously die cast when the female threaded portion 1d is die cast by placing protrusions in the die that project inward so as to correspond to the contours of the pass through long holes 23 before pouring in a synthetic resin or metal.

Figure 5:
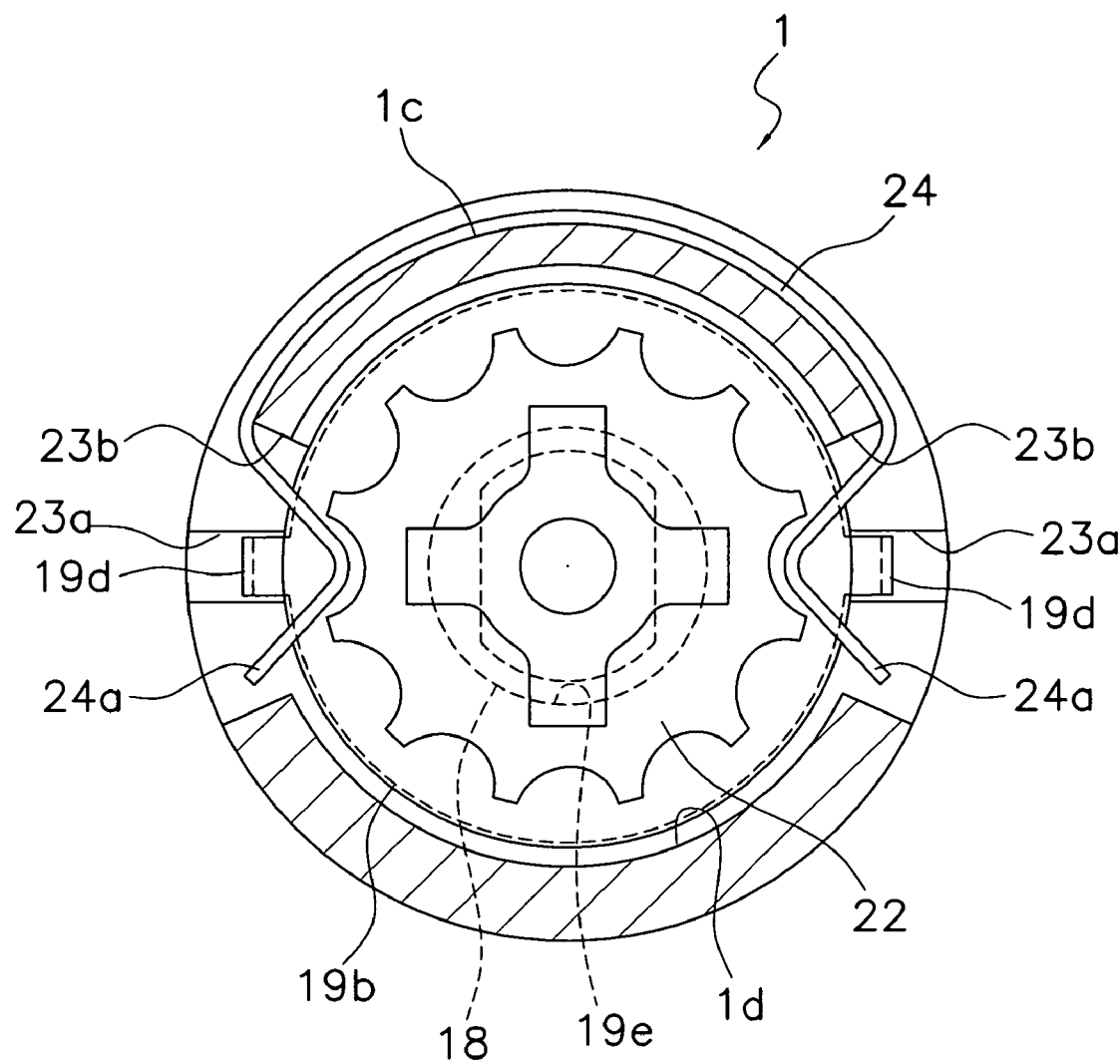
FIG. 5 is a rear cross-sectional view of the mounting tube of the brake operation structure in accordance with the first embodiment of the present invention, viewed along the arrows V—V shown in FIG. 2.

As shown in FIGS. 4 and 5, the pass through long holes 23 are formed in two left and right locations of the rear end side of the mounting tube 1c, such that projections 19d of a friction plate 19b, which will be described later, can engage with the pass through long holes 23. The pass through long holes 23 are approximately T shaped pass through long holes having first pass through long hole portions 23a that engage with the projections 19d and are extended in the front to rear direction, and second pass through long hole portions 23b that connect with the first pass through long hole portions 23a and are formed along the circumferential direction. Note that the second pass through long hole portions 23b are formed such that portions thereof are continuous with and lie on the annular mounting groove 25 in which the spring member 24 is mounted.

In order to mount the friction plates 19b in this type of mounting tube 1c, the friction plates 19b are placed inside the inner peripheral portion of the mounting tube 1c after being tilted in the front to rear direction. Once the projections 19d are placed in the pass through long holes 23, the friction plates 19b are turned upright, and the projections 19d engage with the pass through long hole 23. A rear drag mechanism 9 that brakes the spool 3 is accommodated in the interior of the mounting tube 1c. A brake operation structure 6 for adjusting the braking force of the rear drag mechanism 9 is mounted on the exterior.

As shown in FIG. 1, a rotor drive mechanism 7 for rotating the rotor 2, and an oscillating mechanism 8 that uniformly winds fishing line onto the spool 3 by moving the spool 3 back and forth along the rotational center of the rotor 2, are arranged in the interior of the body 1a.

The rotor drive mechanism 7 includes a master gear 11 that rotates together with a handle shaft 10, and a pinion gear 12 that meshes with the master gear 11. The pinion gear 12 is formed into a tubular shape, and a front portion thereof extends toward the spool 3 and passes through the center of the rotor 2. The pinion gear 12 is rotatively supported by bearings 13a, 13b that are supported by the body 1a. A spool shaft 14 passes through the center of the pinion gear 12, and is movable forward and backward along the rotational axis of the pinion gear 12. The spool 3 is non-rotatably mounted on the tip of a spool shaft 14. A predetermined gap is maintained between the inner diameter in the center of the pinion gear 12 and the outer diameter of the spool shaft 14.

By rotating the handle shaft 10a with the handle 10, the oscillating mechanism 8 will cause the spool shaft 14 to move forward and backward. The oscillating mechanism 8 has a worm shaft 15 arranged on the lower inner side of the spool shaft 14, a slider 16 that moves forward and backward along the drive shaft 15, a guide shaft (not shown in the figures) that is arranged below the worm shaft 15, and an intermediate gear (not shown in the figures) that is fixed on the tip of the worm shaft 15 and which meshes with the pinion gear 12. The worm shaft 15 and the guide shaft are arranged parallel with the spool shaft 14.

As shown in FIGS. 2 and 3, the rear drag mechanism 9 includes a cylindrical bush 18, a friction engagement unit 19 composed of 6 friction plates 19a, 19b, 19c (three types) that are arranged to be adjacent to each other from front to rear, a coil spring 21 for pressing the friction plates 19a, 19b, 19c of the friction engagement unit 19, and a pressing member 22 that presses the coil spring 21.

The bush 18 is mounted on the outer periphery of the rear portion of the spool shaft 14 so as to be non-rotatable and movable in the axial direction. Corrugated portions 18a that are formed side by side in the circumferential direction and which serve to produce sound, and a flange portion 18b, are arranged to adjacent to each other from front to rear on the central outer peripheral surface of the bush 18. A chamfered portion 18c is formed on the outer peripheral surface of the rear portion of the bush 18. In addition, a long hole 18d is formed in the inner peripheral portion of the bush 18, and is non-rotativelty mounted on a chamfered portion 14a formed on the end of the spool shaft 14. The tip of a plate spring 20 mounted on the reel body 1a is in contact with the corrugated portions 18a. In this way, when the bush 18 rotates together with the spool shaft 14 during drag operation, the plate spring 20 will oscillate and generate sound.

As shown in FIG. 3, the friction plates 19a are annular drag washers. A total of three friction plates 19a are arranged in an alternating order with other type of friction plate from the rear portion of the flange portion 18b.

The two friction plates 19b are washers having ear-like projections 19d that engage with the pass through long holes 23. The friction plates 19b non-rotatably engage with the mounting tube 1c, and are non-rotatable with respect to the mounting tube 1c. The friction plates 19b are arranged in the second frontmost position and in the rearmost position. As shown FIGS. 3 and 5, the friction plates 19b project outward in the radial direction, and have two projections 19d that can engage with the pass through long holes 23 of the mounting tube 1c (described below). As shown in FIG. 5, the projections 19d are arranged such that they are symmetrical in two locations in the left to right direction. In addition, the friction plates 19a are formed such that the maximum outer diameter of the projections 19d is smaller than the diameter of the outer peripheral portion of the mounting tube 1c. In addition, the diameter of the inner peripheral portion 19e of the friction plate 19b is formed to be larger than the inner diameters of the friction plates 19a, 19c, i.e. the outer diameter of the bush 18.

The friction plate 19c is a key washer that is non-rotatably mounted on the bush 18 via the chamfered portion 18c, and is mounted in the fourth position from the front. Note that the number and the shape of the friction plates 19a, 19b, 19c of the friction engagement portion 19 are merely as illustrations, and are not limited by those presented as the present embodiment. One end of the coil spring 21 arranged on the rear portion of the friction engagement portion 19 is in contact with the rear surface of the friction plate 19a.

The pressing member 22 has a large diameter brim portion 22a on the front end thereof, and has a recessed front face which can engage with the other end of the coil spring 21. In addition, corrugated portions 22b for producing sound are formed next to each other in the circumferential direction on the central outer peripheral surface of the pressing member 22. Connecting portions 22c that project outward in the radial direction in an X shape are formed on the rear end of the outer peripheral surface of the pressing member 22. A spring member 24 mounted on the mounting tube 1c is in contact with the corrugated portions 22b. A male threaded portion 22d that screws into the female threaded portion 1d of the mounting tube 1c is formed on the outer peripheral surface of the brim portion 22a of the pressing member 22.

The spring member 24 is a resilient wire member curved into a semicircular shape, and a pair of projections 24a that are bent so as to project outward on the inner sides are formed on both ends of the semicircle. The spring member 24 is mounted in an annular mounting groove 25 formed in the mounting tube 1c. Through holes 25a are formed in two locations in the annular mounting groove 25, and the projections 24a pass through the through holes 25a and contact with the corrugated portions 22b. The spring member 24 functions to generate sound during drag operation, and also functions to retain the pressing member 22. In other words, the projections 24a contact the rear surface side of the brim portion 22a and prevent the pressing member 22 from falling out from the inner peripheral portion of the mounting tube 1c.

As shown in FIGS. 2 and 3, the brake operation structure 6 has the above described mounting tube 1c provided on the rear portion of the reel body 1a of the reel unit 1, the operation knob 27 for adjusting the braking force of the spool 3, and a screw member 28 that is screwed onto the operation knob 27.

The operation knob 27 is formed into a closed-end tubular shape in which the rear end has a slightly shortened diameter. The operation knob 27 can accommodate the mounting tube 1c, and can adjust the braking force of the spool 3 rotating the operation knob 27. The female threaded portion 27a is formed on the tip side of the inner peripheral surface of the operation knob 27. An engagement recess 27b is formed on the bottom surface of the operation knob 27 such that the edge portion of the engagement recess 27b projects toward the pressing member 22. The engagement recess 27b is non-rotatably engaged with a connector 22c so as to be movable in the axial direction. In this way, when the operation knob 27 is rotated, the pressing member 22 that is screwed into the female threaded portion 1d will rotate and move forward and rearward, the coil spring 21 will extend and contract, and the drag force will be increased and decreased.

The screw member (an example of the engagement member) 28 has first and second divided members 28a, 28b that include half brims, such that the first and second divided members 28a, 28b together form a cylindrical member having a brim when the first and second divided members 28a, 28b are coupled to one another. Large diameter brim portions 31a, 31b that contact with the operation knob 27 on the tip portion are formed on the outer peripheral surface of the first and second divided members 28a, 28b, and male threaded portions 29a, 29b are formed on the central portion of the outer peripheral surface of the first and second divided members 28a, 28b, so as to screw into the female threaded portion 27a formed on the inner peripheral surface of the operation knob 27. The brim portions 31a, 31b are formed to project outward in the radial direction, and the outer diameter of the brim portion 31a, 31b is larger than the outer diameter of the male threaded portion 29a, 29b. In this way, when the female threaded portion 27a formed on the inner periphery of the operation knob 27 is screwed onto the male threaded portions 29a, 29b formed on the outer periphery of the screw member 28, the operation knob 27 can come into contact with the brim portions 31a, 31b of the screw members 28 and be securely screw-mounted onto the screw member 28. Half annular retaining protrusions 30a, 30b that engage with the retaining groove 26 are formed to project inward in the radial direction on the rear end of the inner peripheral surface of the first and second divided members 28a, 28b. A pair of positioning protrusions 32a (see FIG. 3) is formed on a surface of the first divided member 28a that meets the second divided member 28b. A pair of positioning holes (not shown in the figures) is formed on a surface of the second divided member 28b that meets the first divided member 28a, such that the pair of positioning protrusions 32a engages the pair of positioning holes. In this way, the two divided members 28a, 28b will be accurately positioned, and the divided male threaded portions 29a, 29b will be aligned so that they can be screwed into the female threaded portion 27a.

Next, the operation of the rear drag reel will be described.

The bail arm 4 is pushed over to the line releasing side when fishing line is to be released from the reel unit 1. Then, when the fishing rod is cast, fishing line is reeled out from the spool 3. The bail arm 4 will return to the line-retrieving side when the fishing line is reeled in. When the handle 10 is rotated in the line winding direction in this state, this rotational force is transmitted to the pinion gear 12 via the handle shaft 10 and the master gear 11. The rotational force transmitted to the pinion gear 12 rotates the rotor 2 on the front portion of the pinion gear 12. In addition, the rotational force transmitted to the pinion gear 12 rotates the worm shaft 15 via the intermediate gear (not shown in the figures) that is meshed with the pinion gear 12. When this occurs, the slider 16 that meshes with the spiral grooves of the worm shaft 15 is guided by a guide shaft and moves forward and backward. When the slider 16 moves, the spool shaft 14 and the spool 3 reciprocate forward and backward together with the slider 16. Fishing line that is guided from the bail 4 arm and the line roller 5 is uniformly wound around the outer periphery of the spool 3 forward and backward due to the rotation of the rotor 3 and forward and backward movement of the spool 3.

The rear drag mechanism 9 brakes the spool 3, and the drag force on the spool 3 can be adjusted by rotating the operation knob 27. When the operation knob 27 on the rear portion of the reel unit 1 is tightened, the pressing member 22 will move forward, and the coil spring 21 in contact with the pressing member 22 will push inward. When this occurs, the plurality of friction plates 19a, 19b, 19c of the friction engagement unit 19 will be pressed into contact with each other, and the bush 18 will be pressed toward the reel body 1a by the plurality of friction plates 19a, 19b, 19c. Thus, by pressing the bush 18 toward the reel body 1a, it will become difficult to rotate the spool shaft 14 that is not rotatable with respect to the bush 18, and the drag force applied to the spool 3 will strengthen. On the other hand, when the operation knob is loosened, the pressing member 22 moves rearward, and the compressed state of the coil spring 21 is gradually released. When this occurs, the pressing of the bush 18 applied by the friction plates 19a, 19b, 19c will be released, it will become easier to rotate the spool shaft 14 that is not rotatable with respect to the bush 18, and the drag force applied to the spool 3 will weaken.

With this type of rear drag mounting mechanism 9 that is mounted on the reel unit 1, because pass through long holes 23 are provided that pass through from the outer peripheral portion of the mounting unit 1c to the inner peripheral portion, it is possible to simultaneously form the pass through long holes 23 and the female threaded portion 1d through casting, by placing a loose core in the mounting unit 1c where the female threaded portion 1d is supposed to be and removing the loose core after the casting. Thus, because there is no need for post-processing of a cut-out groove as in the case of a conventional structure, formation of the mounting tube 1c will become easy.

Next, the assembly of the brake operation structure 6 will be described.

When the brake operation structure 6 is to be assembled, the rear drag mechanism 9 is first assembled, and then the spring member 24 is mounted on the annular mounting groove 25. Then, both of the divided members 28a, 28b are mounted on the mounting tube 1c in a state in which the half annular retaining protrusions 30a, 30b are engaged in the retaining groove 26. With the female threaded portion 27a screwed onto the male threaded portions 29a, 29b, the operation knob 27 is screwed onto the screw member 28 until the tip of the operation knob 27 is in contact with the brim portions 31a, 31b. At this point, the engagement recess 27b will be engaged with the connector 22c of the pressing member 22. In this way, the operation knob 27 will be rotatably mounted on the mounting unit 1c and retained therein.

Due to the above structure, with the brake operation structure 6 and the function of the rear drag mechanism 9 as described in the present embodiment, the operation knob 27 can be easily mounted on the mounting unit 1c, and the operation knob 27 can be stably rotated with respect to the mounting tube 1c. In addition, because the operation knob 27 can be retained with respect to the mounting unit 1c without employing a fixing bolt, the operation knob 27 can be mounted on the mounting unit 1c without having to compromise the outward appearance of the operation knob 27. In addition, the operation knob 27 can be made so as to not fall from the mounting tube 1c without employing a retaining member.

Second Embodiment

Referring now to FIGS. 6–15, a brake operation structure in accordance with other embodiments of the present invention will now be explained. In view of the similarity between the first and other embodiments, the parts of the other embodiments that are identical to the parts of the first embodiment will be given the same reference numerals as the parts of the first embodiment. Moreover, the descriptions of the parts of the other embodiments that are identical to the parts of the first embodiment may be omitted for the sake of brevity.

Figure 6:
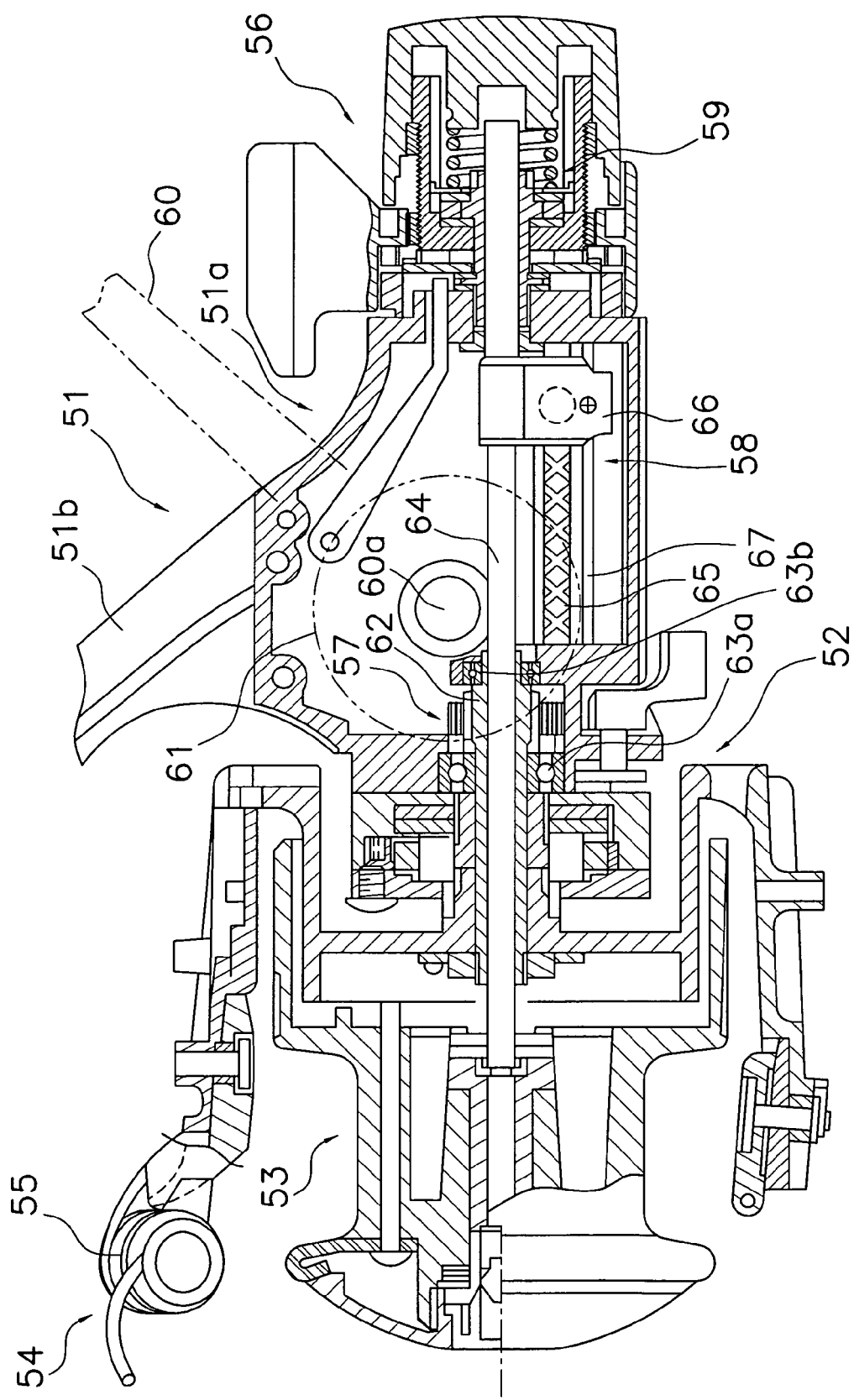
FIG. 6 is a cross-sectional view of a spinning reel according to a second embodiment of the present invention.

FIG. 6 shows a rear drag reel in accordance with a second embodiment of the present invention, and primarily includes a reel unit 51 having a handle 60, a rotor 52 rotatively supported on the front of the reel unit 51, and a spool 53 arranged on the front of the rotor 52 and around which fishing line is wound. A bail arm 54 for winding fishing line around the spool 53 is pivotably mounted on the rotor 52. A line roller 55 that guides the fishing line is mounted on the bail arm 54.

As shown in FIG. 6, the reel unit 51 includes a body 51a, and a rod attachment portion 51b for attaching the spinning reel to a fishing rod is formed on the upper portion of the body 51a. A rotor drive mechanism 57 for rotating the rotor 52, and a level wind drive mechanism 58 that uniformly winds fishing line evenly onto the spool 53 by moving the spool 53 back and forth along the rotational center of the rotor 52, are provided in the interior of the reel body 51a. The rear portion of the reel body 51a has a rear drag mechanism 59 disposed therein. A brake operation mechanism 56 is mounted in the rear portion of the reel body 51a, and serves to operate the rear drag mechanism 59.

The rotor drive mechanism 57 includes a master gear 61 that rotates together with a handle shaft 60, and a pinion gear 62 that meshes with the master gear 61. The pinion gear 62 is formed into a tubular shape, and a front portion thereof extends toward the spool 53 and passes through the center of the rotor 52. The pinion gear 62 is rotatively supported by ball bearings 63a, 63b that are supported by the reel body 51a. A spool shaft 64 passes through the center of the pinion gear 62, and is movable forward and backward along the rotational axis of the pinion gear 62. A predetermined gap is maintained between the inner diameter of the pinion gear 62 and the outer diameter of the spool shaft 64.

By rotating the handle shaft 60a with the handle 60, the level wind drive mechanism 58 moves forward and backward the spool shaft 64, on the tip of which the spool 53 is non-rotatably mounted. The level wind drive mechanism 58 includes a worm shaft 65 disposed on the lower inner side of the spool shaft 64, a slider 66 that moves forward and backward along the worm shaft 65, a guide shaft 67 that is disposed below the worm shaft 65, and an intermediate gear (not shown in the figures) that is disposed on one end of the worm shaft 65 to mesh with the pinion gear 62. The worm shaft 65 and the guide shaft 67 are disposed parallel with the spool shaft 64.

Figure 7:
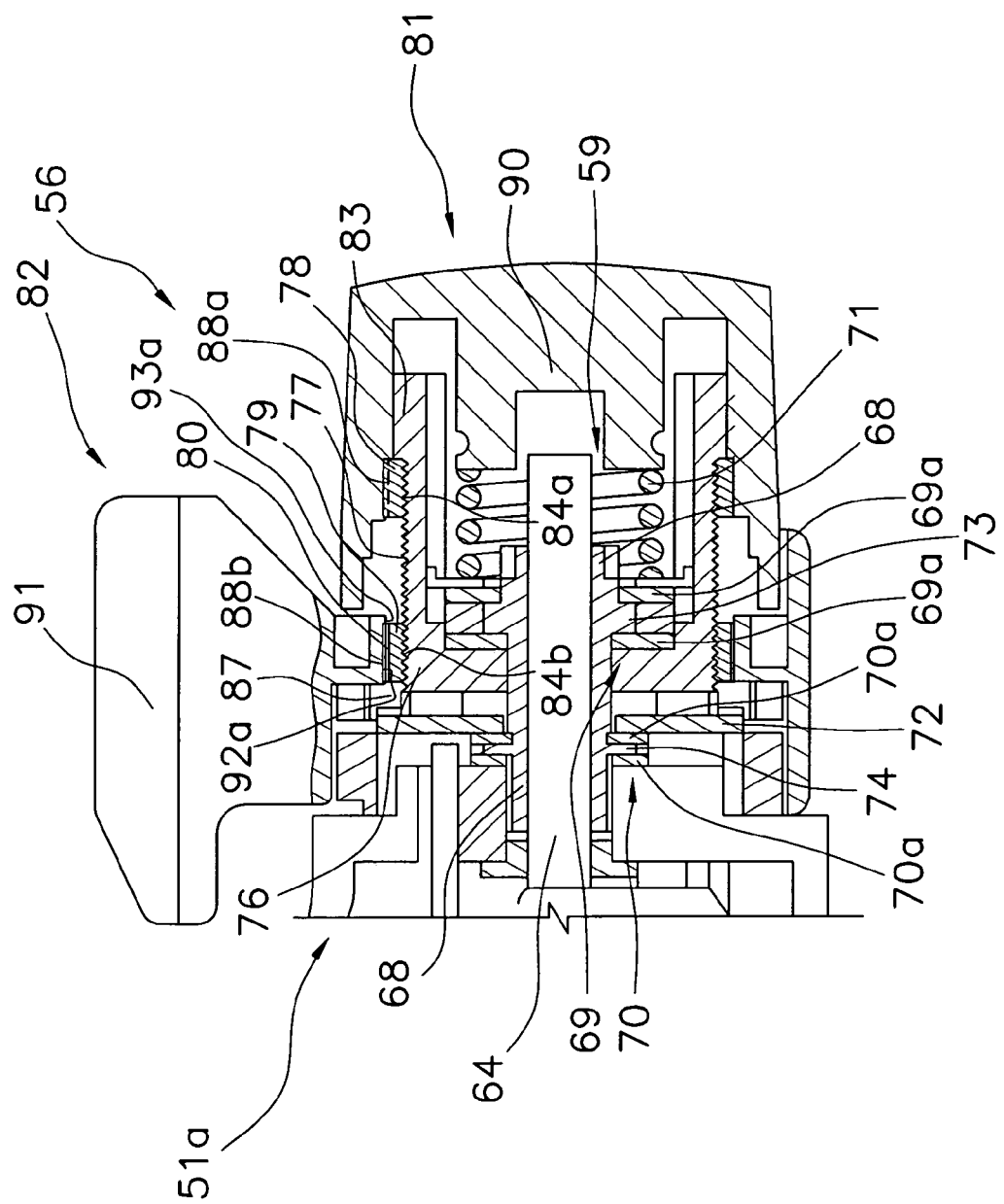
FIG. 7 is an enlarged cross-sectional view of the brake operation structure of the spinning reel in accordance with the second embodiment of the present invention.

As shown in FIG. 7, the rear drag mechanism 59 includes a cylindrical bush 68, first and second friction engagement portions 69, 70 that include a plurality of friction plates 69a, 70a, a coil spring 71 for urging the friction plates 69a of the first friction engagement portion 69, and a pressing member 72 for pressing the second friction plates 70a. The bush 68 is inserted over the outer periphery of the rear portion of the spool shaft 64. The spool shaft 64 is non-rotatable and slidable with respect to the bush 68. A first flange portion 73 is arranged on the outer peripheral surface of the rear portion of the bush 68, and a second flange portion 74 is arranged on the outer peripheral surface of the front portion of the bush 68. The friction plates 69a, 70a of the first and second friction engagement portions 69, 70 are respectively arranged on the first and second flange portions 73, 74. The coil spring 71 is arranged on the rear portion of the first friction engagement portion 69, and the pressure member 72 is arranged on the rear portion of the second friction engagement portion 70.

Figure 8:
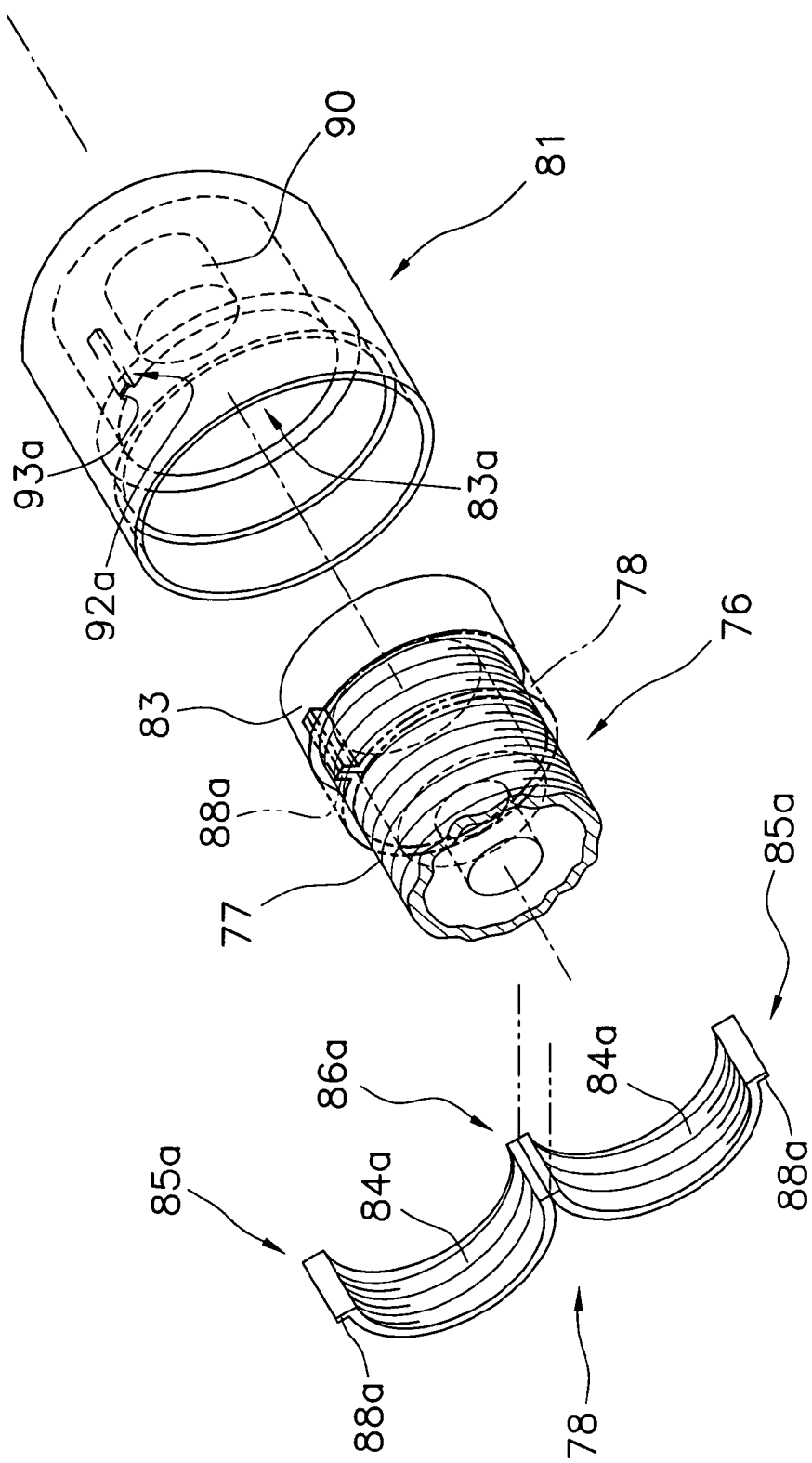
FIG. 8 is an exploded oblique view of the brake operation structure in accordance with the second embodiment of the present invention.

As shown in FIGS. 7 and 8, the brake operation structure 56 includes a tubular mounting unit 76 arranged on the rear portion of the reel body 51a of the reel unit 51, first and second screw members 78, 79 (another example of the engagement member), a retaining member 80 that retains the first and second screw members 78, 79 on the mounting unit 76, and first and second operation members 81, 82. The mounting unit 76 has a male threaded portion 77 and a tubular portion 83 that is unitarily formed with the male threaded portion 77. Female threaded portions 84a, 84b that capable of screwing onto the male threaded portion 77 of the mounting unit 76 are respectively arranged on the inner peripheral surfaces of the first and second screw members 78, 79. The tubular portion 83 is formed such that the outer diameter thereof is larger than the inner diameter of the female threaded portions 84a, 84b of the first and second screw members 78, 79.

Each of the first and second screw members 78, 79 is divided in the axial direction into semi-circular shapes, and first and second joining portions 85a, 86a (85b, 86b not shown in the figures) are respectively formed on the screw members 78, 79. The first and second screw members 78, 79 are screwed and mounted onto the mounting unit 76, with the first screw member 78 being on the rear side of the male threaded portion 77, and the second screw member 79 being on the front side of the male threaded portion 77. Projections 88a, 88b that project in the radial direction are respectively formed on the outer peripheral surface of the first joining portions 85a, 85b of the first and second screw members 78, 79. An engagement portion 87 that serves to transmit the movement of the second screw member 79 to the pressing member 72, and that engages non-rotatably and axially movably with the pressing member 72, is arranged between the second screw member 79 and the pressing member 72.

As shown in FIGS. 7 and 8, the first operation member 81 is formed into a closed-end tubular shape, and has an accommodation portion 83a that can accommodate the tubular portion 83. A pressing portion 90 is integrally formed with the bottom of the accommodation portion 83a. The first operation member 81 is mounted on the first screw member 78 that is screwed onto the outer periphery of the threaded portion 77 of the mounting unit 76. At this point, the pressing portion 90 is linked in series with the coil spring 71 mounted on the rear portion of the first friction engagement portion 69.

The second operation member 82 is formed into a cylindrical shape, and has a protrusion 91 that projects outward in the radial direction and serves to rotatably operate the second screw member 79. The second operation member 82 is mounted on the retaining member 80 that is mounted on the second screw member 79, which is to the front of the first operation member 81.

The first and second operation members 81, 82 have recessed portions 92a formed in the inner cylindrical surface, and the recessed portions 92a and the projections 88a, 88b of the first and second screw member 78, 79 can engage with each other. Here, in order to prevent the projections 88a, 88b from falling out from the recessed portions 92a after the recessed portions 92a are coupled with the projections 88a, 88b, a restriction portion 93a (an example of the detent portion) is formed in the front portion of the bottom of the recessed portions 92a. The restriction portions 93a are formed as a protrusion that projects from the bottom portion of the recessed portions 92a toward the center of the first and second screw members 78, 79.

Next, the operation of the rear drag reel will be described.

The bail arm 54 is pushed over to the line releasing side when fishing line is to be released from the reel unit 51. Then, when the fishing rod is cast, fishing line is reeled out from the spool 53. The bail arm 54 will return to the line-retrieving side when the fishing line is reeled in. When the handle 60 is rotated in the line winding direction in this state, this rotational force is transmitted to the pinion gear 62 via the handle shaft 60 and the master gear 61. The rotational force transmitted to the pinion gear 62 rotates the rotor 52 on the front portion of the pinion gear 62. In addition, the rotational force transmitted to the pinion gear 62 rotates the drive shaft 65 via the intermediate gear (not shown in the figures) that is meshed with the pinion gear 62. When this occurs, the slider 66 that meshes with the spiral grooves of the worm shaft 65 is guided by a guide shaft 67 and moves forward and backward. When the slider 66 moves, the spool shaft 14 and the spool 53 reciprocate forward and backward together with the slider 66. Fishing line that is guided from the bail arm 54 and the line roller 55 is uniformly wound around the outer periphery of the spool 53 forward and backward through the rotation of the rotor 52 and the forward and backward movement of the spool 3.

The rear drag mechanism 59 serves to adjust the drag force with respect to the spool 53 by rotating the first and second operation members 81, 82. When the first operation member 81 on the rear portion of the reel unit 51 is compressed, the pressure portion 90 unitarily formed with the first operation member 81 moves forward, and the coil spring 71 linked with the pressure portion 90 is pressed. When this occurs, the surfaces of the plurality of friction plates 69a of the first friction engagement portion 69 come into contact with each other, and the first flange 73 of the bush 68 is grasped by the plurality of friction plates 69a. Thus, by pressing on the first flange portion 73 of the bush 68, it will become difficult to rotate the spool shaft 64 that is not rotatable with respect to the bush 68, and the drag force applied to the spool 53 will strengthen. On the other hand, when the first operation member 81 is loosened, the pressure portion 90 moves rearward, and the compressed state of the coil spring 71 is gradually released. When this occurs, the pressure applied to the first flange portion 73 by the friction plates 69a will be released. Accordingly, it will become easier to rotate the spool shaft 64 that is not rotatable with respect to the bush 68, and the drag force applied to the spool 53 will weaken.

When the second operation member 82 is tightened, both the second operation member 82 and the second screw member 79 will be rotated. When this occurs, the pressing member 72 will move forward along the spool shaft 64 via the engagement portion 87 arranged between the second screw member 79 and the pressing member 72. Due to the movement of the pressure member 72, the surfaces of the plurality of friction plates 70a of the second friction engagement portion 70 come into contact with each other, and the second flange portion 74 of the bush 68 is grasped by the friction plates 70a. Thus, by pressing the second flange portion 74 of the bush 68, it will become difficult to rotate the spool shaft 64 that is not rotatable with respect to the bush 68, and the drag force applied to the spool 53 will strengthen. On the other hand, when the second operation member 82 is loosened, the pressure member 72 moves rearward along the spool shaft 64 and is pulled back and away from the second friction engagement portion 70. When this occurs, the pressure applied to the second flange portion 74 by the friction plates 70a will be released, it will become easier to rotate the spool shaft 64 that is not rotatable with respect to the bush 68, and the drag force applied to the spool 53 will weaken.

Next, the procedure for assembling the brake operation structure 56 will be described.

When the brake operation structure 56 is to be assembled, the divided second screw member 79 will be first screwed onto the front of the male threaded portion 77 of the mounting unit 76. Next, a snap ring formed into a C shape is mounted on the outer peripheral surface of the second screw member 79, and the second screw member 79 is coupled to the mounting tube 76. Then, the second operation member 82 that is formed into a cylindrical shape is fitted from the tubular portion 83 side toward the second screw member 79, and the recessed portions 92a formed in the inner cylindrical surface of the second operation member 82 is engaged with the projection 88b arranged on the first joining portion 85a of the second screw member 79. Next, the divided first screw member 78 is screwed and mounted onto the rear side of the male threaded portion 77 of the mounting unit 76. Next, the bottom of the first operation member 81 that is formed into a closed-end cylindrical shape is fitted toward the tubular portion 83, and the pressing portion 90 formed on the bottom of the first operation member 81 is inserted into the interior of mounting unit 76 while the cylindrical portion of the first operation member 81 is fitted onto the outer periphery of the first screw member 78. Then, the recessed portion 92a formed in the inner cylindrical surface of the first operation member 81 is fitted onto the projection 88a provided on the first screw member 78.

With the brake operation structure 56 of the present embodiment that is assembled as described above, even if the tubular portion 83 is formed with a diameter that is larger than the inner thread peak diameter of the female threaded portions 84a, 84b of the first and second screw members 78, 79, both screw members 78, 79 are divided and thus can be easily mounted on the mounting unit 76. In addition, by forming the outer shapes of the screw members 78, 79 larger than the outer shape of the tubular member 83, the first and second operation members 81, 82 can be easily mounted on the screw members 78, 79.

On the other hand, even if the first and second operation members 81, 82 and the first and second screw members 78, 79 can be easily mounted on the mounting unit 76, it is important to prevent problems such as the disassembly of the rear drag mechanism 59 by preventing the operation members 81, 82 and the screw members 78, 79 from falling off from the mounting unit 76. With the brake operation structure 56 of the present embodiment, the screw members 78, 79 are prevented from falling off from the mounting tube 76 by the tubular portion 83 which is formed to have a diameter that is larger than that of the inner thread peak diameter of the female threaded portions 84a, 84b of the screw members 78, 79. In addition, the operation members 81, 82 are made non-rotatable and non-movable in the axial direction with respect to the screw members 78, 79 by fitting the recessed portions 92a of the operation members 81, 82 onto the projections 88a, 88b of the screw members 78, 79. Because of this, since the screw members 78, 79 are prevented from falling off, the operation members 81, 82 that are mounted on the screw members 78, 79 are also prevented from falling off from the mounting unit 76.

Because of the above, with the brake operation structure 56 of the present embodiment, the operation knobs (the first and second operation members 81, 82) can be easily mounted on the mounting unit 76, and the first and second operation members 81, 82 can be stably rotated with respect to the mounting tube 76, while the function of the rear drag mechanism 59 is unaffected. In addition, because the first and second operation members 81, 82 are retained with respect to the mounting unit 76 without employing a fixing bolt, the first and second operation members 81, 82 can be mounted on the mounting tube 76 without compromising the outward appearance of the first and second operation members 81, 82. Furthermore, the operation knob can be made so that it will not fall off from the mounting unit 76, without employing a retaining member.

OTHER EMBODIMENTS (a) In the aforementioned embodiments, examples of the operation knobs of the rear drag mechanism 9, 59 of the brake operation structures 6, 56 are illustrated. However, the operation knobs are not limited to the aforementioned embodiments, and may be any type if they operate the mechanisms of the reel unit 1.

Figure 9:
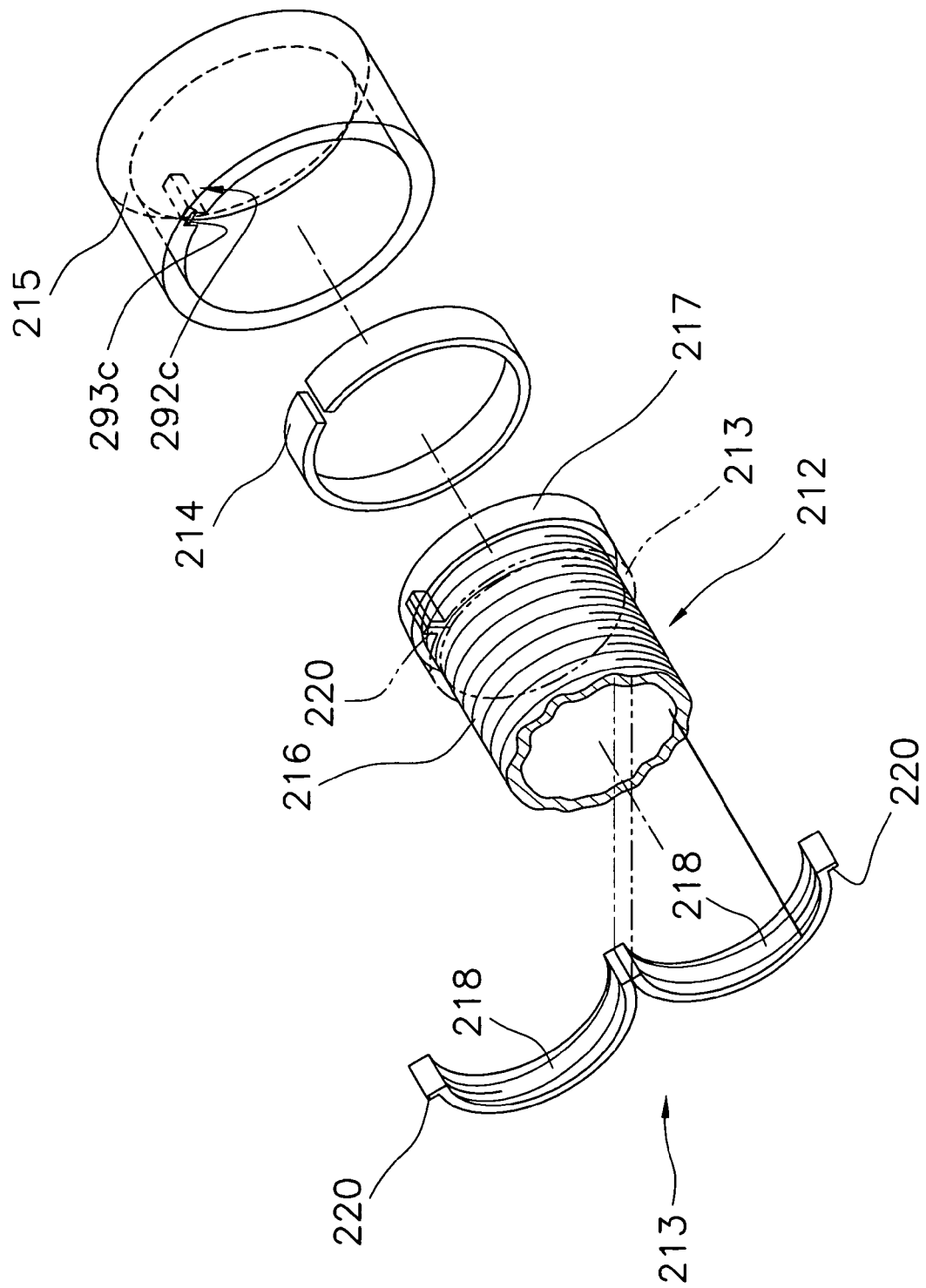
FIG. 9 is an exploded oblique view of the brake operation structure in accordance with the other embodiment (a) of the present invention.

FIG. 9 shows a brake operation structure according to another embodiment. In this brake operation structure, a third screw member 213, a retaining member 214, and a third operation member 215 are operation knobs for a casting control mechanism in a dual bearing reel. The casting control mechanism in a dual bearing reel applies a braking force to a spool by grasping a spool shaft, or a shaft such as a threaded shaft of the level wind mechanism, which rotates in cooperation with rotation of the spool shaft. The brake operation structure of the dual bearing reel shown in FIG. 9 includes a screw portion 212 that is arranged on the body of the reel unit, a third screw member 213, a retaining member 214, and a third operation member 215. The screw portion 212 includes a male threaded portion 216 that is formed on the outer peripheral surface, and a tubular portion 217 that is integrally formed with the male threaded portion 216. A female threaded portion 218 that can be screwed onto the male threaded portion 216 of the screw portion 212 is arranged on the third screw member 213, and the tubular portion 217 is formed such that the diameter thereof is larger than the inner diameter of the female threaded portion 218.

A recessed portion 292c is formed in the inner peripheral surface of the cylindrical portion of the third operation member 215, and a restriction portion 293c (an example of the detent portion) is formed on the bottom of the recessed portion 292c. The restriction portion 293c includes a protrusion that projects from the bottom of the recessed portion 292a toward the center of the third screw member 213. The third operation member 215 can be fitted onto the projection 220 of the third screw member 213 from the tubular portion 217 side.

Even with the operation knobs of the casting control mechanism of this type of dual bearing reel, the third screw member 213 can be divided and mounted on the male threaded portion 216 of the screw portion 212. Accordingly, the same effect as that of the aforementioned embodiments can be obtained because the third screw member 213 is prevented from falling off by the tubular portion 217.

(b) In the aforementioned first embodiment, half annular retaining protrusions are provided on the screw member. However it is also possible to provide annular protrusions on the mounting unit, and retaining grooves on the screw member.

(c) In the aforementioned first embodiment, a rear drag reel that does not have a second operation member is illustrated. However, the present invention can also be applied to a rear drag reel having a second operation member similar to the one shown in the second embodiment.

Figure 10:
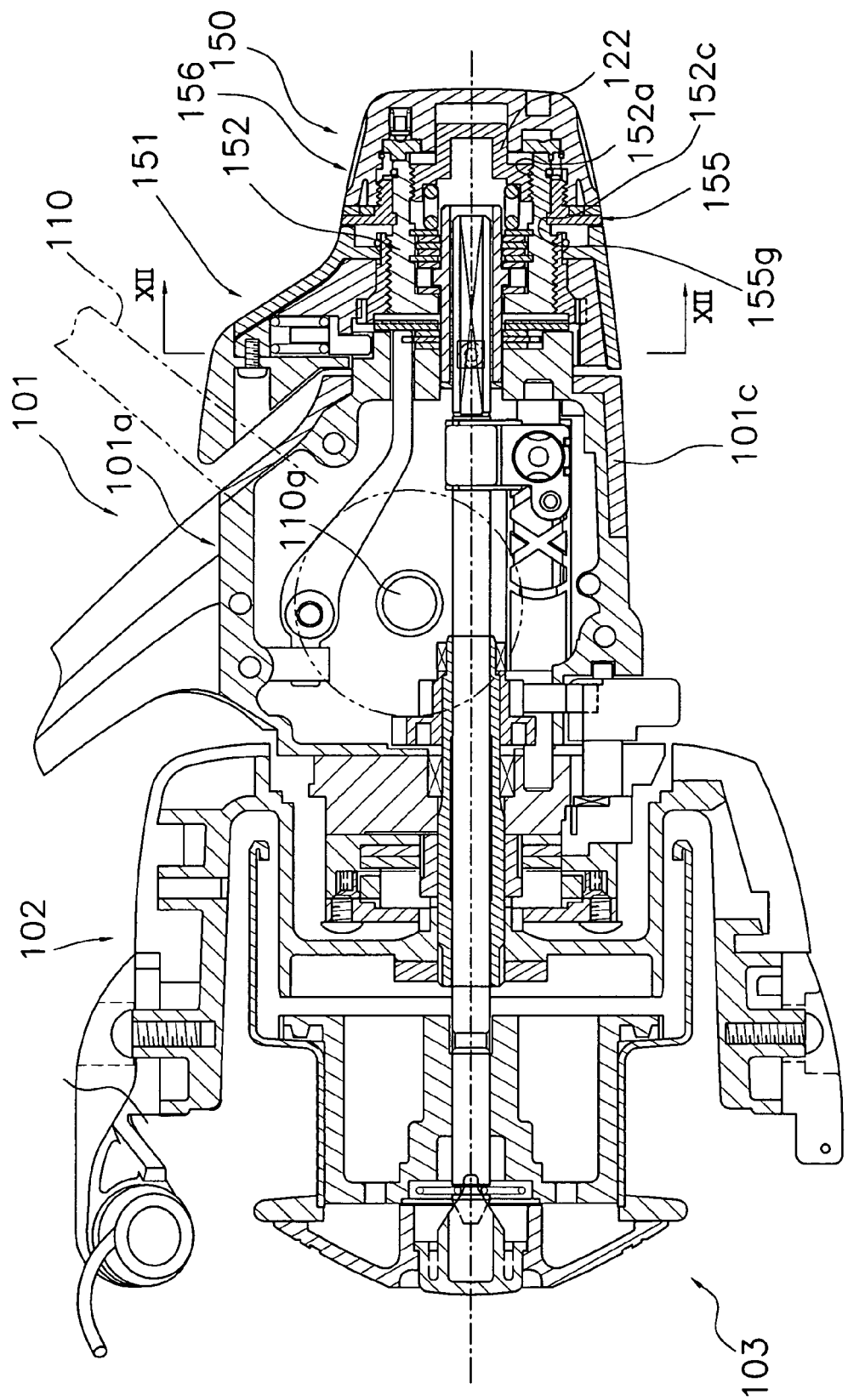
FIG. 10 is a cross-sectional view of a spinning reel according to the other embodiment (c) of the present invention.

As shown in FIG. 10, a spinning reel having the second operation member primarily includes a reel unit 101 that rotatively supports a handle 110, a rotor 102, a spool 103, a first rear drag knob (an example of the brake operation structure) 150, and a second rear drag knob 151.

Figure 11:
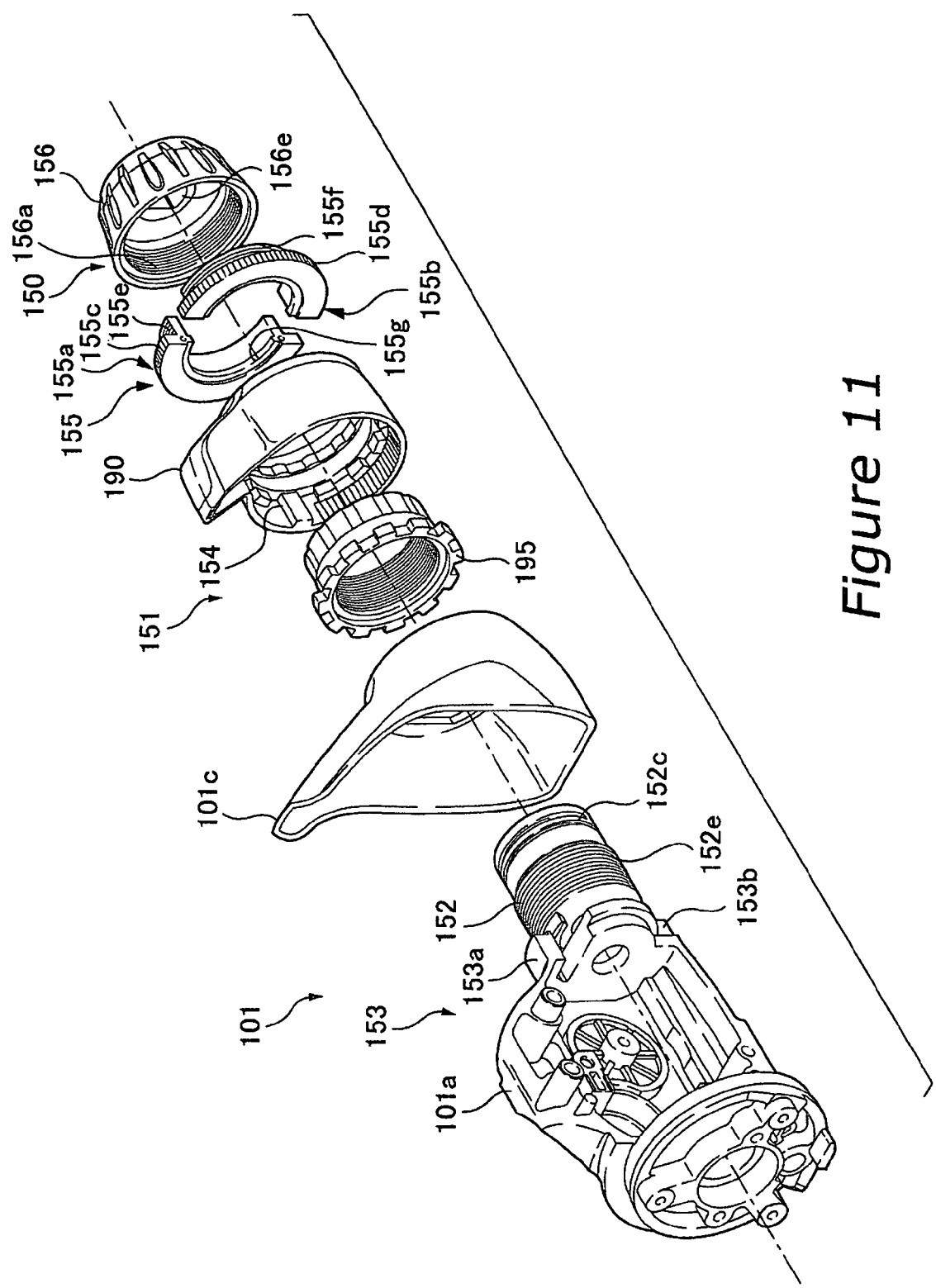
FIG. 11 is an exploded oblique view of the brake operation structure in accordance with the other embodiment (c) of the present invention.

As shown in FIGS. 10 and 11, a mounting tube 152 that projects rearward is unitarily formed on the rear portion of the reel body 101a, and a cover member 101c is mounted so that the mounting tube 152 passes therethrough. As shown in FIGS. 10 and 11, a first female threaded portion 152a is formed in the rear portion of the inner peripheral surface of the mounting tube 152, and a third male threaded portion 152e is formed on the central portion of the outer peripheral surface of the mounting tube 152. An annular groove 152c is formed in the rear of the third male threaded portion 152e. A retaining groove 155g that is formed in the inner peripheral surface of the screw member 155 fits into the annular groove 152c.

Figure 15:
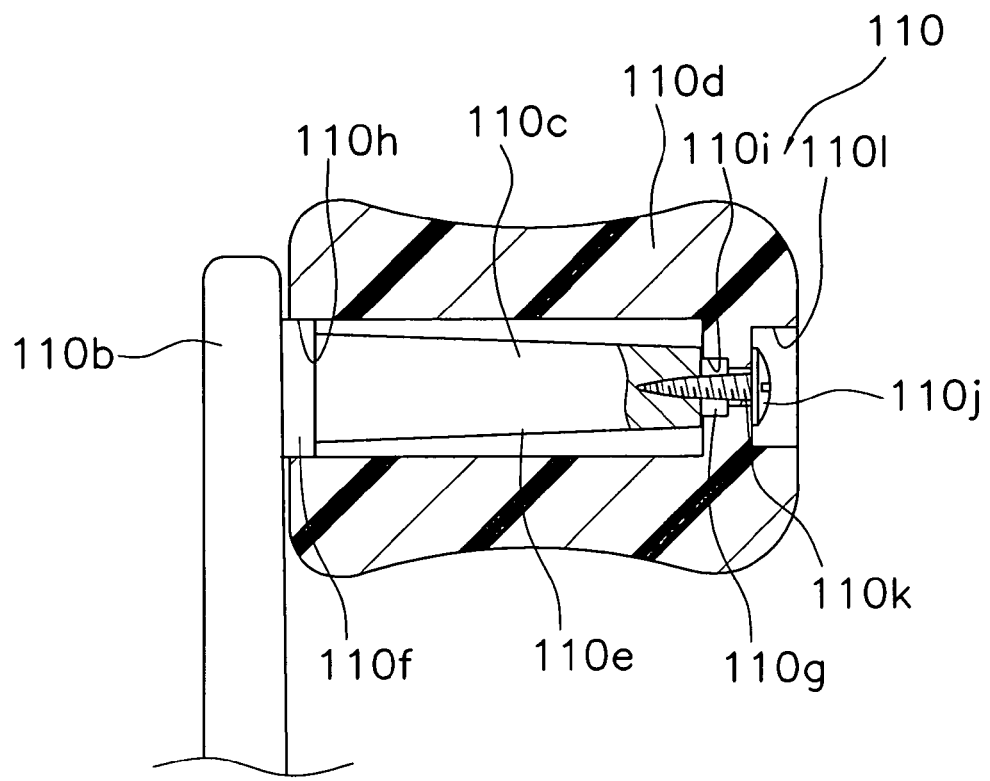
FIG. 15 is an enlarged cross-section of a handle of the rear drag operation structure in accordance with the other embodiment (c) of the present invention.

As shown in an enlarged view in FIG. 15, the handle 110 includes a handle arm 110b that is mounted on the tip of the handle shaft 110a, a mounting unit 110c that is unitarily formed to project in an orthogonal direction to the handle arm 110b on the tip of the handle arm 110b, and a handle knob 110d that is rotatively mounted on the mounting unit 110c. The handle arm 110b and the mounting unit 110c are unitarily formed by die casting a zinc alloy.

The mounting unit 110c has a taper portion 110e whose diameter becomes smaller toward the removal direction (the right direction in FIG. 15) in order to remove the die cast mold, a cylindrical first support portion 110f that is formed on the base end portion of the taper portion 110e to have a large diameter, and a cylindrical second support portion 110g that is formed on the tip portion of the taper portion 110e to have a small diameter. Note that the length in the axial direction of the first support portion 110f and the second support portion 110g is formed so as to be shorter than the length in the axial direction of the taper portion 110e, and thus it is not difficult to remove the die cast mold.

The handle knob 110d is formed for example with a synthetic resin, and is a drum shaped member whose central portion is concave. As shown in FIG. 15, the handle knob 110d has a first tubular portion 110h that is supported on the inner periphery of the tip portion thereof by the first support portion 110f, a second tubular portion 110i that is formed to have a smaller diameter than the first cylindrical portion 110h and is supported on the inner periphery thereof by the second support portion 110g, a through hole 110k that is formed to have a smaller diameter than the second cylindrical portion 110i and in which a screw member 110j is mounted in order to screw onto the tip of the second support portion 110g, and an accommodation recess 110l which is formed to have a larger diameter than the through hole 110k and in which the head portion of the screw member 110j is accommodated. Note that a slight gap is formed between the head portion of the screw member 110j and the handle knob 110d, and thus the handle knob 110d can be rotated with respect to the mounting unit 110c.

A conventional handle has only a taper portion on the mounting unit, and the inner peripheral portion of the handle knob is formed in a taper shape and supported by the taper surface. However, in this case, it is extremely difficult to match the taper of the mounting unit with that of the handle knob. In contrast to this, with the handle 110 disclosed above, the first tubular portion 110h and the second tubular portion 110i of the handle knob 110d are respectively supported by the cylindrical portion of the first support portion 110f and the second support portion 110g. Thus, it is not necessary to match the tapers as is the case with a conventional handle. Therefore, the support structure of the handle knob 110d will be simplified.

As shown in FIG. 11, the first rear drag knob 150 includes an operation knob 156 and a screw member 155. The operation knob 156 is, for example, made of a synthetic resin, and is formed into a closed-end tubular shape in which the rear end has a slightly shortened diameter. The operation knob 156 can accommodate the mounting tube 152, and can adjust the braking force of the spool 3 by being pivoted. The female threaded portion 156a is formed on the inner peripheral surface of the operation knob 156. An engagement recess 156e whose edge portion projects toward the first pressing member 122 is formed in the bottom surface of the operation knob 156. In this way, when the operation knob 156 is pivoted, the first pressing member 122 that is screwed into the female threaded portion 152a will rotate and move forward and rearward, and the drag force will be increased and decreased.

The screw member 155 has first and second divided members 155a, 155b, which form a cylindrically shape when engaged with one another. The first and second divided members 155a, 155b include Large diameter brim portions 155c, 155d that contact with the operation knob 156 are formed on its tip portions of the outer peripheral surface of the first and second divided members 155a, 155b, while male threaded portions 155e, 155f are formed on the central portions of the outer peripheral surface of the first and second divided members 155a, 155b. The male threaded portions 155e, 155f can screw into the female threaded portion 156a formed on the inner peripheral surface of the operation knob 156. The rest of the structure of the screw member 155 is similar to that of the screw member 28 of the first embodiment. Therefore, detailed explanation of other aspects of the screw member 155 will be omitted herein.

Figure 12:
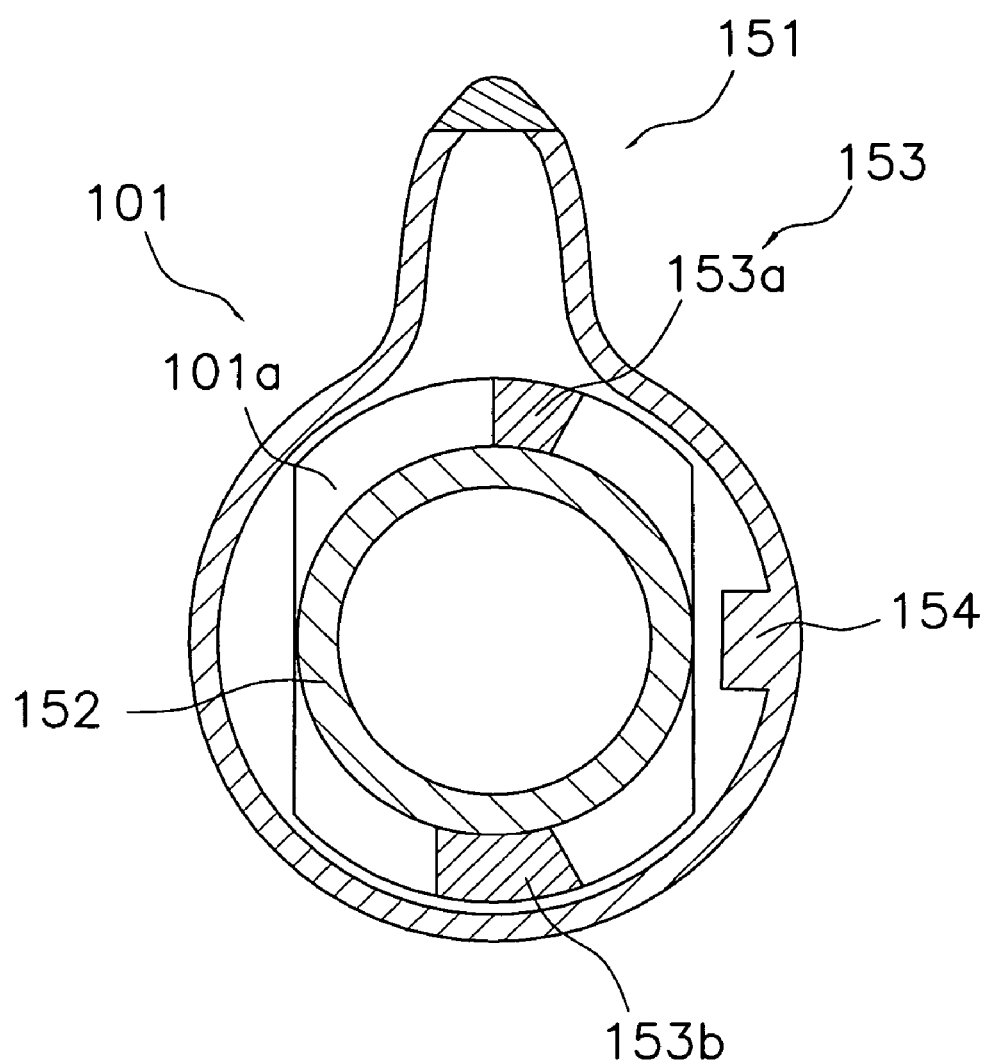
FIG. 12 is a schematic cross-sectional view of the rear drag operation structure in accordance with the other embodiment (c) of the present invention, viewed approximately along the line XII—XII shown in FIG. 10.

As shown in FIGS. 11 and 12, the second rear drug knob 151 is mounted on the mounting tube 152, and is pivotable relative to the rear portion of the reel body 101a. The second rear drug knob 151 includes a lever member 190 and a tubular member 195 that is non-rotatively mounted to the lever member 190.

Figure 13:
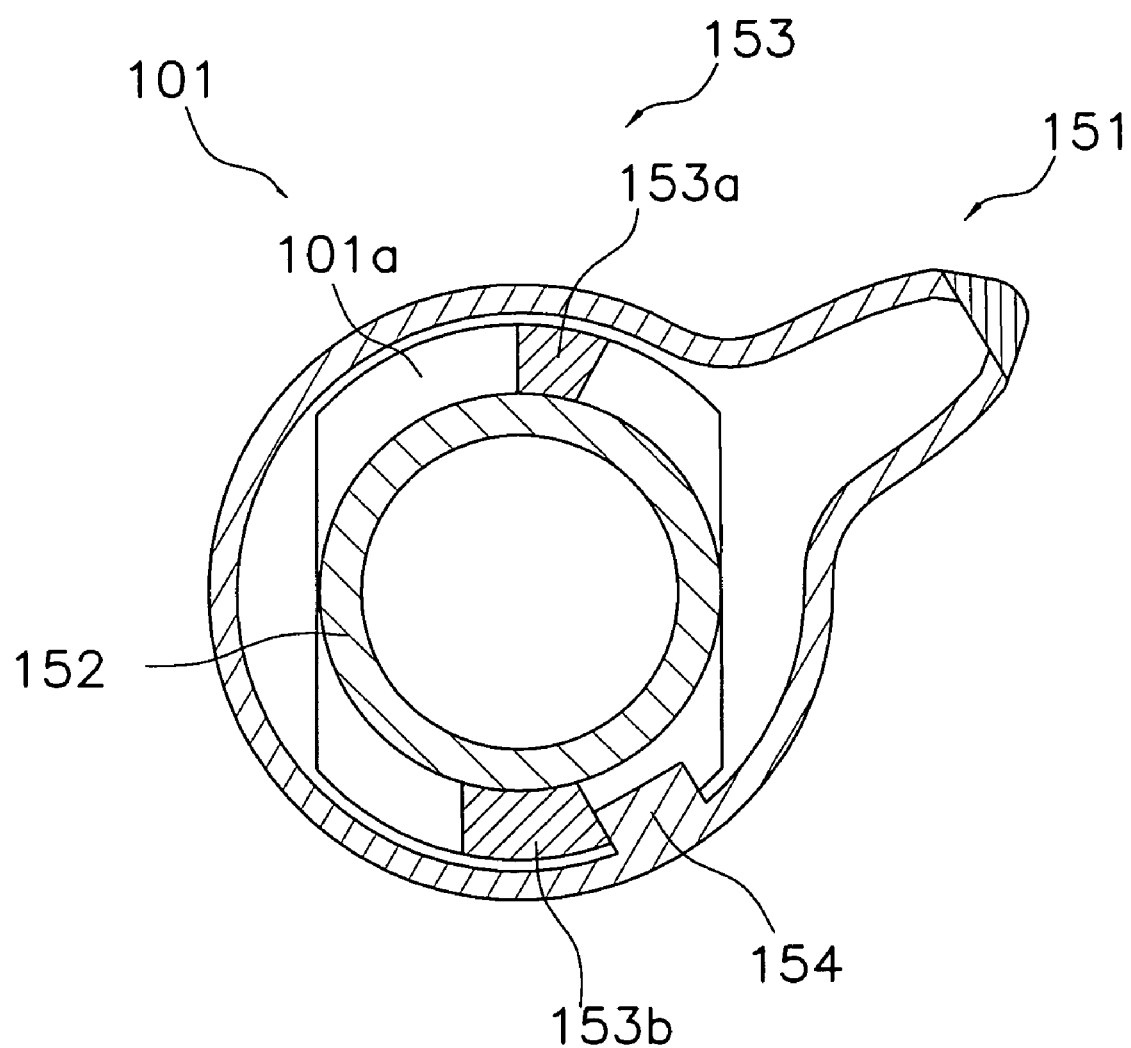
FIG. 13 is a schematic cross-sectional view of the rear drag operation structure in accordance with the other embodiment (c) of the present invention, viewed approximately along the line XII—XII shown in FIG. 10, where the second rear drag knob is pivoted clockwise.
Figure 14:
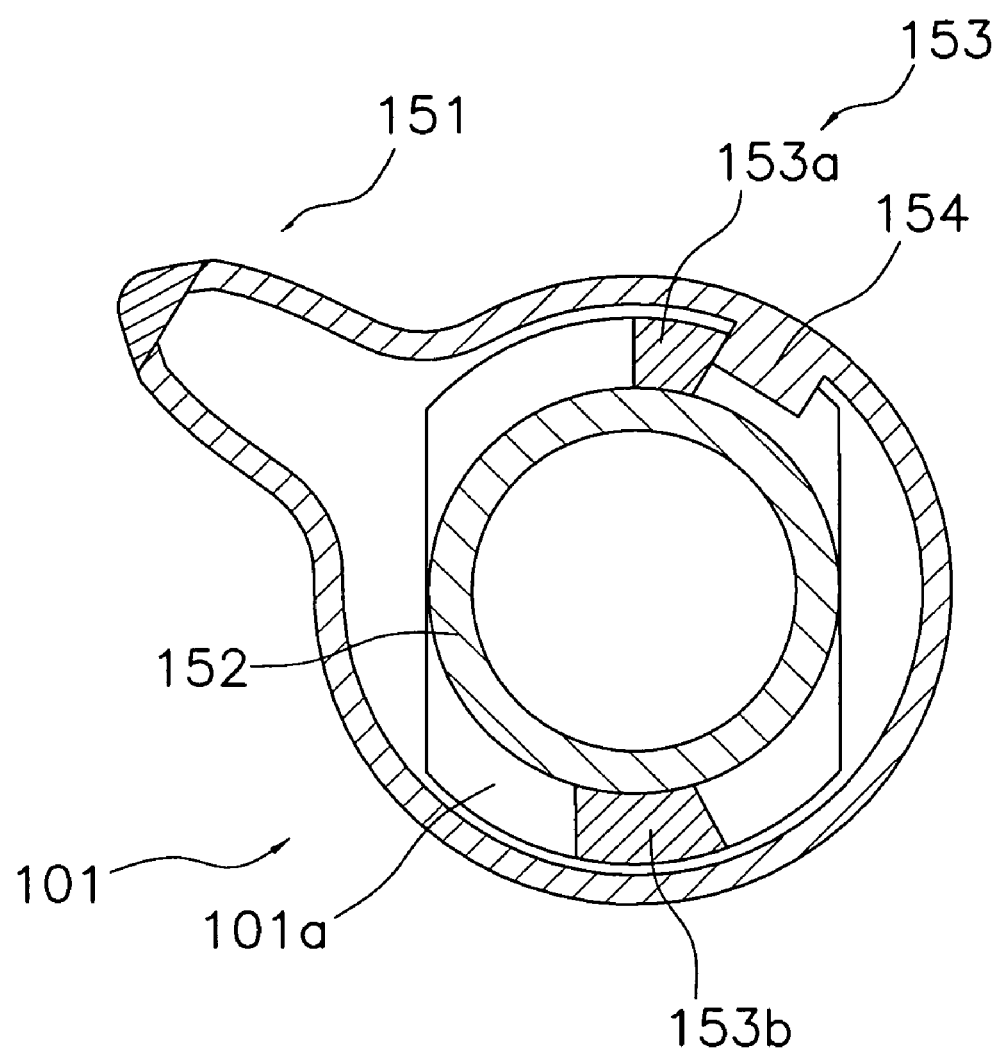
FIG. 14 is a schematic cross-sectional view of the rear drag operation structure in accordance with the other embodiment (c) of the present invention, viewed approximately along the line XII—XII shown in FIG. 10, where the second rear drag knob is pivoted counter-clockwise.

The rear portion of the reel body 101a has engagement protrusions 153 that are unitarily formed on the outer peripheral surface of the rear portion of the reel body 101a on the front side of the mounting tube 152. The engagement protrusions 153 have a first engagement protrusion 153a that is unitarily formed on the outer peripheral surface of the upper side of the mounting tube 152, and a second engagement protrusion 153b that is unitarily formed on the outer peripheral surface of the lower surface of the mounting tube 152. In addition, a single rotation restriction portion 154 is formed to project inward on the right inner peripheral portion of the second rear drag knob 151, and serves to contact with the first engagement protrusion 153a and the second engagement protrusion 153b of the engagement protrusion 153 to restrict the pivot range of the second rear drag knob 151. Here, when the second rear drag knob 151 is pivoted in the clockwise direction, as shown in FIG. 13, the rotation restriction portion 154 of the second rear drag knob 151 will contact with the second engagement protrusion 153b on the lower side of the mounting tube 152, and the rotation of the second rear drag knob 151 will be restricted. In addition, when the second rear drag knob 151 is pivoted in the counter-clockwise direction, as shown in FIG. 14, the rotation restriction portion 154 of the second rear drag knob 151 will contact with the first engagement protrusion 153a on the upper side of the mounting tube 152, and the rotation of the second rear drag knob 151 will be restricted. In other words, the second rear drag knob 151 can pivot between the first engagement protrusion 153a and the second engagement protrusion 153b, and the pivot angle is for example in a range between 100 degrees and 150 degrees, and more specifically 120 degrees. In addition, the surfaces of the first engagement protrusion 153a and the second engagement protrusion 153b that contact with the rotation restriction portion 154 are slanted on the right side as shown in FIGS. 13 and 14 so as to snugly contact with the rotation restriction portion 154.

With this type of spinning reel, the rotation restriction portion 154 is arranged on the inner peripheral portion of the second rear drag knob 151. The first engagement protrusion 153a and the second engagement protrusion 153b that respectively project in the upward and downward directions of the outer peripheral portion of the mounting tube 152 are provided. By having the rotation prevention portion 154 abut with the first engagement protrusion 153a and the second engagement protrusion 153b, the pivot range of the second rear drag knob 151 is restricted. Here, because the first engagement protrusion 153a and the second engagement protrusion 153b that respectively project in the upward and downward directions of the outer peripheral portion of the mounting tube 152 are provided, it will no longer be necessary to provide a rotation prevention member having projections that project in the left and right directions of the mounting tube 152 as in the case of a conventional art. Thus, the left to right width of the rear portion of the reel body 101a can be reduced, while allowing the pivot range of the second rear drag knob 151 to be restricted.

(d) In the aforementioned second embodiment, the first operation member 81 is fixedly coupled to the first screw member 78 through the recessed portions 92a and the restriction portions 93a. However, the manner in which the first operation member 81 is coupled to the first screw member 78 is not limited to that shown in the aforementioned second embodiment, and the first operation member 81 may be pressed fitted or adhered onto the first screw member 78.

Also, although the second operation member 82 of the second embodiment and the third operation members 215 of the other embodiment (a) are fixedly coupled onto the second and third screw members 79, 213 with the recessed portion 92a, 292c and the restriction portions 93a, 293c after the second and third screw members 79, 213 are resiliently engaged with the retaining members 80, 214. However, in this case also, the manner in which the operation member is mounted onto the screw member is not limited to those disclosed in the aforementioned embodiments. Instead, the retaining members 80, 214 may be press fitted or adhered to the second and third members 79, 213, and the second and third operation members 82, 215 may be press fitted or adhered to the retaining members 80, 214.

(e) In the aforementioned second embodiment and the other embodiment (a), the first to third operation members 81, 82, 215 are prevented from falling off from the first to third screw members 78, 79, 213 with the projections of the restriction portions 93a, 293c. However, the shape of the restriction portions 93a, 293c are not limited to those shown in the aforementioned embodiments. The restriction portions may have any shape so long as they are able to prevent the operation members from falling off.

(f) In the aforementioned first embodiment, the pass through long holes 23 are formed in two left and right locations of the rear end side of the mounting tube 1c. However, the structure of the pass through long hole is not limited to that shown in the first embodiment, and the pass through long holes may be formed, for example, in two upper and bottom locations of the rear end side of the mounting tube 1c. In addition, one or two or more pass through long holes 23 can be provided as long as such pass through long holes can be mounted in the interior of the mounting tube. Furthermore, the shape of the pass through long holes 23 is not limited to an approximate T shape, and may be approximate square or oval shapes.

According to the present invention, the engagement member engages with the mounting unit and the operation knob between the outer periphery of the mounting unit and the inner periphery of the operation knob, such that the operation knob is retained in the projecting direction of the mounting unit. In this state, the braking force of the spool is adjusted by pivoting the operation knob. Thus, the operation knob can be prevented from falling off from the mounting unit, and the operation knob can be stably pivoted with respect to the mounting unit. Thus, the operation knob can be mounted on the mounting unit without having to compromise the outward appearance of the operation knob because there is no need to employ a fixing member such as a fixing bolt in order to retain and operate the operation knob.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2004-150084, 2004-171290, 2004-171293. The entire disclosure of Japanese Patent Applications Nos. 2004-150084, 2004-171290, 2004-171293 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A brake operation structure for a fishing reel that is mounted on a reel unit of the fishing reel, the brake operation structure being adapted to adjust a braking force applied to a spool, the brake operation structure comprising:
   a mounting unit having a tubular shape and formed to project from the reel unit;
   an operation knob that is formed in a closed-end tubular shape to accommodate the mounting unit; and
   an engagement member having a plurality of divided portions, the plurality of divided portions having a tubular shape when coupled to one another, the operation knob being pivotably retained to the mounting unit when the engagement member engages an outer peripheral portion of the mounting unit and an inner peripheral portion of the operation knob.

2. The brake operation structure for a fishing reel according to claim 1, wherein
   the mounting unit has an annular groove formed on its outer peripheral portion, and
   the engagement member has a first retaining projection formed on its inner peripheral portion, the first retaining projection engaging the annular groove of the mounting unit.

3. The brake operation structure for a fishing reel according to claim 1, wherein
   the engagement member has a first male threaded portion formed on its outer peripheral portion, and
   the operation knob has a first female threaded portion formed on its inner peripheral portion, the first male threaded portion engaging the first female threaded portion.

4. The brake operation structure for a fishing reel according to claim 3, wherein
   the engagement member includes a cylindrical portion and a brim portion that is formed on an outer periphery of one end of the cylindrical portion, the brim portion projecting radially outward, an outer diameter of the brim portion being greater than an outer diameter of the first male threaded portion formed on the outer peripheral portion of the cylindrical portion.

5. The brake operation structure for a fishing reel according to claim 1, wherein
   the mounting unit has a second female threaded portion formed in its inner peripheral portion,
   the operation knob has a moving member that is non-rotatably mounted on a bottom surface inside the closed-end tubular shape, the moving member being movable in a direction of a spool shaft relative to the operation knob, and
   the moving member has a second male threaded portion on its outer peripheral portion, the second male portion engaging the second female threaded portion of the mounting unit, the moving member pivoting and moving in the spool shaft direction relative to the mounting unit when the operation knob is pivoted.

6. The brake operation structure for a fishing reel according to claim 1, wherein
   the mounting unit has on its outer peripheral portion a second retaining projection on its rear end, and a third male threaded portion on its base end, the second retaining projection being formed to project radially outward, and
   the engagement member has a third female threaded portion formed on its inner peripheral portion, the third female threaded portion engaging the third male threaded portion of the mounting unit, an outer diameter of the second retaining projection being greater than an inner diameter of the third female threaded portion.

7. The brake operation structure for a fishing reel according to claim 6, wherein
the operation knob has one of a recess and a projection formed in its inner peripheral portion, the one of the recess and the projection extending in a direction of a spool shaft, and
the engagement member has the other of the recess and the projection formed in its outer peripheral portion, the other of the recess and the projection engaging the one of the recess and the projection to restrict relative rotation between the operation knob and the engagement member.

8. The brake operation structure for a fishing reel according to claim 7, wherein
a detent portion is formed projecting from a bottom of the recess so as to prevent the projection from disengaging from the recess.

9. The brake operation structure for a fishing reel according to claim 7, wherein
the operation knob has the recess formed in its inner peripheral portion, and
the engagement member has the projection formed in its outer peripheral portion.

10. The brake operation structure for a fishing reel according to claim 1, wherein
the mounting unit is formed to project rearward from the reel unit of a spinning reel, so as to accommodate a rear drag mechanism that applies a braking force to the spool, and
the brake operation structure is adapted to adjust the braking force of the rear drag mechanism applied to the spool by pivoting the operation knob.

11. The brake operation structure for a fishing reel according to claim 10, wherein
the operation knob has an adjustment portion that is arranged to project from a bottom surface inside the closed-end tubular shape, and
the adjustment portion is designed to move in a spool shaft direction within the inner peripheral portion of the mounting unit and adjust the braking force to the spool when the operation knob is pivoted.

12. The brake operation structure for a fishing reel according to claim 1, wherein
the mounting unit is formed to project laterally from the reel unit of a double bearing reel, and
the brake operation structure is a casting control mechanism adapted to adjust a braking force applied to the spool by pivoting the operation knob.

13. A spinning reel, comprising:
a reel unit;
a handle rotatively supported on the reel unit;
a rotor rotatively supported on a front of the reel unit;
a spool disposed on a front of the rotor, fishing line being adapted to be wound around the spool;
a rear drag mechanism adapted to apply a braking force to the spool; and
a brake operation structure that is mounted on the reel unit and adapted to adjust the braking force of the rear drag mechanism, the brake operation structure including
a mounting unit having a tubular shape and formed to project from the reel unit, the rear drag mechanism being accommodated inside the mounting unit,
an operation knob that is formed in a closed-end tubular shape to accommodate the mounting unit, the braking force of the rear drag mechanism being adjusted by pivoting the operation knob, and
an engagement member having a plurality of divided portions, the plurality of divided portions having a tubular shape when coupled to one another, the operation knob being pivotably retained to the mounting unit when the engagement member engages an outer peripheral portion of the mounting unit and an inner peripheral portion of the operation knob.

14. The spinning reel according to claim 13, wherein
the mounting unit has an annular groove formed on its outer peripheral portion; and
the engagement member has a first retaining projection formed on its inner peripheral portion, the first retaining projection engaging the annular groove of the mounting unit.

15. The spinning reel according to claims 13, wherein
the engagement member has a first male threaded portion formed on its outer peripheral portion, and
the operation knob has a first female threaded portion formed on its inner peripheral portion, the first male threaded portion engaging the first female threaded portion.

16. The spinning reel according to claim 15, wherein
the engagement member includes a cylindrical portion and a brim portion that is formed on an outer periphery of one end of the cylindrical portion, the brim portion projecting radially outward, an outer diameter of the brim portion being greater than an outer diameter of the first male threaded portion formed on the outer peripheral portion of the cylindrical portion.

17. The spinning reel according to claims 13, wherein
the mounting unit has a second female threaded portion formed in its inner peripheral portion,
the operation knob has a moving member that is non-rotatably mounted on a bottom surface of the closed-end tubular shape, the moving member being movable in a direction of a spool shaft relative to the operation knob; and
the moving member has a second male threaded portion on its outer peripheral portion, the second male portion engaging the second female threaded portion of the mounting unit, the moving member pivoting and moving in the spool shaft direction relative to the mounting unit when the operation knob is pivoted.

18. The spinning reel according to claim 13, wherein
the mounting unit has on its outer peripheral portion a second retaining projection a rear end, and a third male threaded portion on its base end, the second retaining projection being formed to project radially outward, and
the engagement member has a third female threaded portion formed on its inner peripheral portion, the third female threaded portion engaging the third male threaded portion of the mounting unit, an outer diameter of the second retaining projection being greater than an inner diameter of the third female threaded portion.

19. The spinning reel according to claim 18, wherein
the operation knob has one of a recess and a projection formed in its inner peripheral portion, the one of the recess and the projection extending in a direction of an pivoting axis of the operation knob, and the engagement member has the other of the recess and the projection formed in its outer peripheral portion, the other of the recess and the projection engaging the one of the recess and the projection to restrict relative rotation between the operation knob and the engagement member.

20. The spinning reel according to claim 19, wherein a detent portion is formed projecting from the bottom of the recess so as to prevent the projection from disengaging from the recess.

* * * * *